United States Patent
Rentsch et al.

(10) Patent No.: US 11,753,548 B2
(45) Date of Patent: Sep. 12, 2023

(54) TREATMENT OF SURFACE-REACTED CALCIUM CARBONATE

(71) Applicant: Omya International AG, Oftringen (CH)

(72) Inventors: Samuel Rentsch, Spiegel bei Bern (CH); Matthias Welker, Hésingue (FR); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 1149 days.

(21) Appl. No.: 15/780,831

(22) PCT Filed: Jan. 5, 2017

(86) PCT No.: PCT/EP2017/050184
§ 371 (c)(1),
(2) Date: Jun. 1, 2018

(87) PCT Pub. No.: WO2017/121675
PCT Pub. Date: Jul. 20, 2017

(65) Prior Publication Data
US 2018/0355183 A1    Dec. 13, 2018

Related U.S. Application Data

(60) Provisional application No. 62/311,043, filed on Mar. 21, 2016.

(30) Foreign Application Priority Data

Jan. 14, 2016   (EP) ...................................... 16151383

(51) Int. Cl.
*C09C 1/02* (2006.01)
*C01F 11/18* (2006.01)

(52) U.S. Cl.
CPC ............ *C09C 1/021* (2013.01); *C01F 11/185* (2013.01); *C01P 2004/62* (2013.01);
(Continued)

(58) Field of Classification Search
None
See application file for complete search history.

(56) References Cited

U.S. PATENT DOCUMENTS 4,524,015 A    6/1985   Takahashi et al.
5,977,212 A *  11/1999  Ebner ................. B65D 81/266
                                                      523/210
(Continued)

FOREIGN PATENT DOCUMENTS

CA    2943499 A1 * 10/2015   ........ B01J 20/28057
EP    0320085 B1    6/1989
(Continued)

OTHER PUBLICATIONS

The International Search Report dated Feb. 2, 2017 from PCT/EP2017/050184.
(Continued)

*Primary Examiner* — Pegah Parvini
*Assistant Examiner* — Ross J Christie
(74) *Attorney, Agent, or Firm* — ALGM LLP; Harry J. Guttman

(57) ABSTRACT

The present invention relates to a method for the treatment of a surface-reacted calcium carbonate, wherein the treatment agent is selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, a treated surface-reacted calcium carbonate as well as a use of the treated surface-reacted calcium carbonate as oxygen scavenger.

20 Claims, 10 Drawing Sheets

(52) U.S. Cl.
CPC ....... *C01P 2006/10* (2013.01); *C01P 2006/11* (2013.01); *C01P 2006/12* (2013.01)

(56) References Cited

U.S. PATENT DOCUMENTS

| | | | |
|---|---|---|---|
| 6,666,953 | B1 | 12/2003 | Gane et al. |
| 7,863,367 | B2 * | 1/2011 | Takahashi ............... C09C 1/021 |
| | | | 524/425 |
| 8,187,589 | B2 * | 5/2012 | Schwarzentruber ........................ |
| | | | C09D 17/004 |
| | | | 106/491 |
| 2002/0102404 | A1 * | 8/2002 | Nakai ..................... C09C 1/021 |
| | | | 428/403 |
| 2004/0020410 | A1 | 2/2004 | Gane et al. |
| 2004/0097616 | A1 | 5/2004 | Hoppler et al. |
| 2008/0022901 | A1 * | 1/2008 | Buri ........................ C09C 1/021 |
| | | | 106/471 |
| 2013/0217819 | A1 * | 8/2013 | Buri ........................ C09C 1/021 |
| | | | 524/322 |
| 2014/0288224 | A1 | 9/2014 | Gijsman et al. |

FOREIGN PATENT DOCUMENTS

| | | | | |
|---|---|---|---|---|
| EP | 1550506 | A1 * | 7/2005 | ......... C01B 13/0262 |
| EP | 1550506 | A1 | 7/2005 | |
| EP | 1916276 | A1 | 4/2008 | |
| EP | 2264108 | A1 | 12/2010 | |
| EP | 2264109 | A1 | 12/2010 | |
| EP | 2371766 | A1 | 10/2011 | |
| EP | 2390285 | A1 | 11/2011 | |
| EP | 2447213 | A1 | 5/2012 | |
| EP | 2447328 | A1 | 5/2012 | |
| EP | 2524898 | A1 | 11/2012 | |
| EP | 2722368 | A1 | 4/2014 | |
| EP | 2770017 | A1 | 8/2014 | |
| EP | 2840065 | A1 | 2/2015 | |
| EP | 2966129 | A1 | 1/2016 | |
| EP | 2421508 | B1 | 12/2016 | |
| WO | 92/02587 | A1 | 2/1992 | |
| WO | 0039222 | A1 | 7/2000 | |
| WO | 2004083316 | A1 | 9/2004 | |
| WO | 2005121257 | A2 | 12/2005 | |
| WO | 2008/125955 | A1 | 10/2008 | |
| WO | 2009074492 | A1 | 6/2009 | |
| WO | 2010/038064 | A1 | 4/2010 | |
| WO | 2010/146531 | A1 | 12/2010 | |
| WO | 2013/142473 | A1 | 9/2013 | |
| WO | WO-2014060286 | A1 * | 4/2014 | ........... C07D 307/60 |
| WO | 2015/124494 | A1 | 8/2015 | |

OTHER PUBLICATIONS

The Written Opinion of the International Searching Authority dated Feb. 2, 2017 from PCT/EP2017/050184.
International Search Report from PCT/EP2017/050522, dated Feb. 22, 2017, 3 pages.
Written Opinion from PCT/EP2017/050522, dated Feb. 22, 2017, 5 pages.
Gane et al. (1996) "Void Space Structure of Compressible Polymer Spheres and Consolidated Calcium Carbonate Paper-Coating Formulations" Ind. Eng. Chem. Res., vol. 35, pp. 1753-1764.
Restriction Requirement in U.S. Appl. No. 15/780,501 dated Apr. 7, 2020, 9 pages.
Interview Summary in U.S. Appl. No. 15/780,501 dated Apr. 13, 2020, 3 pages.
Response to Restriction Requirement in U.S. Appl. No. 15/780,501 dated May 5, 2020, 13 pages.
NonFinal Office action in U.S. Appl. No. 15/780,501 dated Jul. 21, 2020, 19 pages.
Interview Summary in U.S. Appl. No. 15/780,501 dated Sep. 9, 2020, 5 pages.
Response to nonfinal Office action in U.S. Appl. No. 15/780,501 dated Oct. 13, 2020, 18 pages.
Poompradub et al. (2011) "Improving Oxidation Stability and Mechanical Properties of Natural Rubber Vulcanizates filled with Calcium Carbonate modified by Gallic Acid" Polym. Bull., vol. 66, pp. 965-977.
Final Office action in U.S. Appl. No. 15/780,501 dated Jan. 14, 2021, 20 pages.
RCE response to final Office action in U.S. Appl. No. 15/780,501 dated Mar. 13, 2021, 22 pages.
Nonfinal Office action in U.S. Appl. No. 15/780,501 dated Mar. 25, 2021, 19 pages.
Response to nonfinal Office action in U.S. Appl. No. 15/780,501 dated Jun. 23, 2021, 15 pages.
Terminal Disclaimer filed in U.S. Appl. No. 15/780,501 dated Aug. 27, 2021, 3 pages.
Notices of Allowance and Allowability in U.S. Appl. No. 15/780,501 dated Sep. 2, 2021 13 pages.

* cited by examiner

TREATMENT OF SURFACE-REACTED CALCIUM CARBONATE

The present invention relates to a method for the treatment of a surface-reacted calcium carbonate, wherein the treatment agent is selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, a treated surface-reacted calcium carbonate as well as a use of the treated surface-reacted calcium carbonate as oxygen scavenger.

A great variety of methods are known such as freeze storage, cold storage, vacuum packaging and packaging under inert atmosphere for reducing or preventing the formation and/or the growth of oomycetes, bacteria and higher organism such as insects that tend to disturb the preservation of foodstuffs. However, most of the oomycetes, bacteria and higher organism need oxygen for their development and growing. Therefore, one well-suited method in food applications to prevent the foodstuff from getting mouldy and rotting is to use oxygen scavengers or oxygen absorbents to absorb or "capture" oxygen from the surrounding, e.g. a gaseous surrounding. For example, such oxygen scavengers are used in food applications, especially food packaging applications, in order to prevent foodstuffs like vegetables, fruits, meat and fish, cheese or processed foods like bread and pastries, chips, peanuts or ready-made meals from becoming mouldy and rotten.

Another application is in the field of cosmetics. Cremes, gels or serums but also make-up, powders etc. are used on the body or skin of humans. Many active substances that are incorporated therein can be destroyed by oxidation and, therefore, it is desirable that these cosmetics are packaged and sold such that a relative low amount of oxygen comes in contact with the active substances. This is possible if oxygen scavengers or oxygen absorbents are used in the cosmetics or cosmetic packaging to absorb or "capture" oxygen from the surrounding, e.g. a gaseous surrounding.

Another application is the protection of packaged metal items. One problem of metal items is the corrosion that is a reaction of the metal with an oxidant such as oxygen that leads to an electrochemical oxidation of the metal also known as rusting. Therefore, it is desirably to package the metal items together with oxygen scavengers or oxygen absorbents that absorb or "capture" oxygen from the surrounding such that oxidation of the metal item is prevented.

Various materials are known to the skilled person comprising oxygen scavenging or adsorbing properties. For example, U.S. Pat. No. 4,524,015 refers to granular oxygen absorbents comprising at least one ascorbic compound selected from ascorbic acid, ascorbic acid salts and mixtures thereof, an alkali metal carbonate, an iron compound, carbon black and water. The granular oxygen absorbents are produced by mixing the compounds and blending them, for example, in a granulating machine.

EP 1 916 276 refers to a packaging material comprising metal-protecting components including a volatile corrosion inhibitor, a desiccant and an oxygen scavenger. The oxygen scavenger may comprise a triazole, for example, a benzotriazole.

US 2014/0288224 refers to non-fibrous-reinforced thermoplastic moulding compositions. The compositions comprise an elementary metal, for example, iron, as oxygen scavenger.

EP 0 320 085 refers to oxygen scavenger for boiled water and method of use. The oxygen scavenger includes ascorbic acid neutralized with diethylaminoethanol.

However, it is not only important that the materials that are used as oxygen scavengers are cheap, non-toxic and easy available materials but also that they provide highly efficient oxygen ($O_2$) scavenging.

Thus, there is still a need for providing a method which addresses the foregoing technical problems described and especially allows for providing materials that can be used as oxygen scavengers, and especially materials that provide improved properties in comparison to materials of the prior art that are already used as oxygen scavengers.

Accordingly, it is an object of the present invention to provide a method for preparing an oxygen scavenger. It is another object of the present invention to provide a material that provides a highly efficient oxygen ($O_2$) scavenging. Especially, it is an object of the present invention to provide materials that provide an improved oxygen ($O_2$) scavenging in comparison to already known oxygen scavenger materials. It is also an object of the present invention to provide an oxygen scavenging material that is non-toxic and can be easily handled. It is also an object of the present invention to provide an oxygen scavenging material that provides a long lasting oxygen ($O_2$) scavenging effect and/or is capable of removing a high amount of oxygen from the surrounding per unit addition of the scavenger. It is a further object of the present invention that the oxygen scavenging material can be used in a great variety of applications.

The foregoing and other objects are solved by the subject-matter as defined herein in the independent claim.

According to one aspect of the present application a method for the treatment of a surface-reacted calcium carbonate is provided. The method comprising the steps of:

a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;

b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and c) combining the surface-reacted calcium carbonate of step a) with the treatment agent of step b) in one or more steps at a temperature of from 10 to 200° C. under mixing, such that the total weight of the treatment agent added is from 0.01 to 40 mg/m$^2$, based on the surface-reacted calcium carbonate of step a).

The inventors surprisingly found out that by the foregoing method it is possible to prepare a treated surface-reacted calcium carbonate that provides a highly efficient oxygen ($O_2$) scavenging, and especially an improved oxygen ($O_2$) scavenging in comparison to already known oxygen scavenger materials. Furthermore, by the method according to the present invention a treated surface-reacted calcium carbonate is provided that provides a long lasting oxygen ($O_2$) scavenging effect and/or is capable of removing a high amount of oxygen from the surrounding. Furthermore, by the method according to the present invention a treated surface-reacted calcium carbonate is provided that is non-toxic, can be easily handled and can be used in a great variety of applications.

According to another aspect of the present invention, a treated surface-reacted calcium carbonate is provided. The treated surface-reacted calcium carbonate comprising a) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source, or as defined herein, and b) a treatment agent is located as a treatment layer on at least a part of the surface of the surface-reacted calcium carbonate and/or the treatment agent is loaded into at least a part of the pores as a pore filler of the surface-reacted calcium carbonate, wherein i) the treatment layer or the pore filler consists of a treatment agent selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, or as defined herein, and/or reaction products thereof, and ii) the total weight of the treatment agent on the total surface area or in the pores of the surface-reacted calcium carbonate is from 0.01 to 40 mg/m$^2$, based on the surface-reacted calcium carbonate of step a).

According to one embodiment of the treated surface-reacted calcium carbonate, the total weight of the treatment agent on the total surface area or in the pores of the surface-reacted calcium carbonate is from 0.01 to 40 mg/m$^2$, preferably from 0.1 to 20 mg/m$^2$ and most preferably from 0.2 to 15 mg/m$^2$.

According to another embodiment of the treated surface-reacted calcium carbonate, the treated surface-reacted calcium carbonate has a moisture pick up susceptibility in the range from 0.05 to 100 mg/g, preferably from 0.1 to 60 mg/g and more preferably from 0.2 to 40 mg/g.

According to yet another embodiment of the treated surface-reacted calcium carbonate, the treated surface-reacted calcium carbonate comprises at least one supplemental agent which is a hydrophobising agent which at least partially covers the treated surface-reacted calcium carbonate or is loaded into at least a part of the pores of treated surface-reacted calcium carbonate, preferably the hydrophobising agent is selected from the group consisting of an aliphatic carboxylic acid having a total amount of carbon atoms from $C_4$ to $C_{24}$ and/or salty reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, a phosphoric acid ester blend of one or more phosphoric acid mono-ester and/or reaction products thereof and one or more phosphoric acid di-ester and/or salty reaction products thereof, polyhydrogensiloxane and salty reaction products thereof, an inert silicone oil, preferably polydimethylsiloxane, an aliphatic fatty aldehyde and/or salty reaction products thereof and mixtures thereof.

According to one embodiment of the treated surface-reacted calcium carbonate, the total weight of the at least one hydrophobising agent on the total surface area or in the pores of the treated surface-reacted calcium carbonate is from 0.001 to 10 mg/m$^2$.

According to a further aspect of the present invention, a use of the treated surface-reacted calcium carbonate as defined herein as oxygen scavenger is provided. The treated surface-reacted calcium carbonate is preferably used in polymer compositions, coatings, preferably paper- or polymer coatings, more preferably paper coatings, food applications, filter and/or cosmetic applications, preferably in food applications and more preferably in food packaging applications.

Advantageous embodiments of the present method are defined in the corresponding sub-claims.

According to one embodiment the natural ground calcium carbonate is selected from calcium carbonate containing minerals selected from the group comprising marble, chalk, dolomite, limestone and mixtures thereof and the precipitated calcium carbonate is selected from the group comprising precipitated calcium carbonates having aragonitic, vateritic or calcitic mineralogical crystal forms or mixtures thereof.

According to one embodiment of the present invention, the surface-reacted calcium carbonate has i) a specific surface area of from 15 m$^2$/g to 200 m$^2$/g, preferably from 27 m$^2$/g to 180 m$^2$/g, more preferably from 30 m$^2$/g to 160 m$^2$/g, and most preferably from 30 m$^2$/g to 150 m$^2$/g, measured using nitrogen and the BET method according to ISO 9277, and/or ii) a volume median grain diameter $d_{50}$ of from 1 to 75 µm, preferably from 2 to 50 µm, more preferably 3 to 40 µm, even more preferably from 4 to 30 µm, and most preferably from 5 to 15 µm, and/or iii) an intra-particle pore size in a range of from 0.004 to 1.6 µm, preferably in a range of from 0.005 to 1.3 µm, especially preferably from 0.006 to 1.15 µm and most preferably of from 0.007 to 1.0 µm, determined from a mercury porosimetry measurement, and/or iv) an intra-particle intruded specific pore volume within the range of 0.1 to 2.3 cm$^3$/g, preferably of 0.2 to 2.0 cm$^3$/g, more preferably from 0.4 to 1.8 cm$^3$/g and most preferably from 0.6 to 1.6 cm$^3$/g calculated from mercury porosimetry measurement.

According to another embodiment of the present invention, the treatment agent is a) liquid at 25° C. and ambient pressure, or b) in molten form, and/or c) dissolved in a solvent, preferably the solvent is selected from the group comprising water, methanol, ethanol, n-butanol, isopropanol, n-propanol, and mixtures thereof, and preferably is water, or d) dispersed in a suspension.

According to yet another embodiment of the present invention, the total weight of the treatment agent of step b) added in step c) is from 0.1 to 40 mg/m$^2$, preferably from 0.5 to 20 mg/m$^2$ and most preferably from 0.7 to 15 mg/m$^2$, based on the surface-reacted calcium carbonate of step a).

According to one embodiment of the present invention, the treatment agent of step b) is added in step c) in an amount of from 0.01 to 80.0 wt.-%, preferably from 0.1 to 70.0 wt.-%, more preferably from 0.5 to 60.0 wt.-% and most preferably from 1.0 to 40.0 wt.-%, based on the total dry weight of surface-reacted calcium carbonate of step a).

According to another embodiment of the present invention, the unsaturated fatty acid is selected from the group consisting of oleic acid, linoleic acid, linolenic acid, crotonic acid, myristoleic acid, palmitoleic acid, sapienic acid, elaidic acid, vaccenic acid, gadoleic acid, erucic acid, nervonic acid, ecosadienoic acid, docosadienoic acid, pinoleic acid, eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, salts of these acids and mixtures thereof, preferably the unsaturated fatty acid is oleic acid or linoleic acid.

According to yet another embodiment of the present invention, the elemental iron is a particulate powder iron having a volume median particle size $d_{50}$ ranging from 5 nm to 10 μm, preferably from 10 nm to 2 μm, and more preferably from 30 nm to 500 nm.

According to one embodiment of the present invention, the method comprises a further step d) of treating the surface-reacted calcium carbonate obtained in step c) with at least one supplemental agent which is a hydrophobising agent, preferably the hydrophobising agent is selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof.

According to another embodiment of the present invention, the method comprises a further step e) of encapsulating the surface-reacted calcium carbonate obtained in step c) or d), preferably with a wax, more preferably with a paraffin wax.

It should be understood that for the purposes of the present invention, the following terms have the following meanings:

A "surface-reacted calcium carbonate" according to the present invention is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source. A $H_3O^+$ ion donor in the context of the present invention is a Brønsted acid and/or an acid salt.

The term "treated" surface-reacted calcium carbonate in the meaning of the present invention refers to a surface-reacted calcium carbonate which has been contacted with a treatment agent such as to obtain a treatment layer on at least a part of the surface and/or its loading into at least a part of the pores of the surface-reacted calcium carbonate.

The term "treatment agent" refers to a compound that is selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof.

A "treatment layer" in the gist of the present invention refers to a layer, preferably a monolayer of a treatment agent on the surface of the at least one surface-reacted carbonate. The "treatment layer" essentially consists of a treatment agent selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and/or reaction products thereof.

A "pore filler" in the gist of the present invention refers to a loading of a treatment agent into at least a part of the pores of the at least one surface-reacted carbonate. The "pore filler" essentially consists of a treatment agent selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and/or reaction products thereof.

The term "essentially" in the meaning of the present invention refers to a treatment layer and/or pore filler that contains compounds differing from the treatment agent selected from the group consisting of ascorbic acid and/or salts thereof, gallic acid and/or salts thereof, unsaturated fatty acids and/or salts thereof, elemental iron, iron (ID-salts, iron (II)-comprising oxides, iron (II, III)-comprising oxides and mixtures thereof, and/or reaction products thereof in an amount of <5 wt.-%, preferably <2 wt.-% and most preferably <1 wt.-%, based on the total weight of the treatment layer and/or pore filler.

The term "base" according to the present invention refers to a base as defined by the Brønsted-Lowry theory. Therefore, a base in the meaning of the present invention is a substance that can accept hydrogen ions ($H^+$)—otherwise known as protons.

The term "surface area" in the meaning of the present invention refers to the BET surface area of the surface-reacted calcium carbonate particles as measured via the BET method according to ISO 9277:2010 using nitrogen.

The term "dry" or "dried" material is understood to be a material having between 0.001 to 20 wt.-% of water, based on the total weight of the surface-reacted calcium carbonate. The % water (equal to "moisture content") is determined gravimetrically. "Drying" in the sense of the present invention means that heating is carried out until the moisture content of the surface-reacted calcium carbonate is in the range from 0.001 to 20% by weight, based on the total weight of the surface-reacted calcium carbonate.

The term "solid" according to the present invention refers to a material that is solid under standard ambient temperature and pressure (SATP) which refers to a temperature of 298.15 K (25° C.) and an absolute pressure of exactly 100 000 Pa (1 bar, 14.5 psi, 0.98692 atm). The solid may be in the form of a powder, tablet, granules, flakes etc.

The term "liquid" according to the present invention refers to a material that is liquid under standard ambient temperature and pressure (SATP) which refers to a temperature of 298.15 K (25° C.) and an absolute pressure of exactly 100 000 Pa (1 bar, 14.5 psi, 0.98692 atm). It is to be noted that the liquid may be a neat liquid or a solution which further comprises a solvent, preferably water. The liquid may also comprise insoluble solids and thus may form a suspension or dispersion.

The term "molten" form in the meaning of the present invention is defined as the state in which a material is entirely liquid, in other words is entirely melted. Whereas the phenomenon of melting occurs at constant temperature on application of energy, a substance is qualified as being molten as of the moment following melting when the temperature begins to rise, as observed on a curve plotting temperature versus energy input obtained by Dynamic Scanning calorimetry, DSC, (DIN 51005: 1983-11).

The term "ambient pressure" according to the present invention refers to the standard ambient temperature pressure (SATP) which refers to an absolute pressure of exactly 100 000 Pa (1 bar, 14.5 psi, 0.98692 atm). The term "reduced pressure" refers to a pressure below the "ambient pressure".

A "suspension" or "dispersion" in the meaning of the present invention comprises insoluble solids and a solvent or liquid, preferably water, and optionally further additives, and usually contains large amounts of solids and, thus, is more viscous and can be of higher density than the liquid from which it is formed.

For the purpose of the present application, "water-insoluble" materials are defined as materials which, when 100 g of said material is mixed with 100 g deionised water and filtered on a filter having a 0.2 µm pore size at 20° C. to recover the liquid filtrate, provide less than or equal to 1.0 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 µm pore size at 20° C. to recover the liquid filtrate, provide more than 1.0 g of recovered solid material following evaporation at 95 to 100° C. of 100 g of said liquid filtrate at ambient pressure.

An "oxygen scavenger" or "oxygen absorber" according to the present invention is able to absorb or "capture" oxygen from the surrounding atmosphere.

The term "absorber" according to the present invention refers to the ability to "scavenge" and maintain retention of the scavenged material over time in isolation, being independent of any material concentration gradient mechanism, and dependent only on absorption saturation. The term "absorption" in the context of this invention includes the physicochemical mechanisms of absorption and adsorption.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

As set out above, the inventive method for the treatment of a surface-reacted calcium carbonate comprises at least the process steps of a), b) and c). In the following, it is referred to further details of the present invention and especially the foregoing steps of the inventive method for the treatment of a surface-reacted calcium carbonate.

Characterization of Step a): Provision of a Surface-Reacted Calcium Carbonate

According to step a) of the process of the present invention, a surface-reacted calcium carbonate is provided.

It is appreciated that the surface-reacted calcium carbonate can be one or more surface-reacted calcium carbonate(s).

In one embodiment of the present invention, the surface-reacted calcium carbonate comprises, preferably consists of, one kind of surface-reacted calcium carbonate. Alternatively, the surface-reacted calcium carbonate comprises, preferably consists of, two or more kinds of surface-reacted calcium carbonates. For example, the surface-reacted calcium carbonate comprises, preferably consists of, two or three kinds of surface-reacted calcium carbonates.

Preferably, the surface-reacted calcium carbonate comprises, more preferably consists of, one kind of surface-reacted calcium carbonate.

The surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source.

A $H_3O^+$ ion donor in the context of the present invention is a Brønsted acid and/or an acid salt.

In a preferred embodiment of the invention the surface-reacted calcium carbonate is obtained by a process comprising the steps of: (a) providing a suspension of natural or precipitated calcium carbonate, (b) adding at least one acid having a $pK_a$ value of 0 or less at 20° C. or having a $pK_a$ value from 0 to 2.5 at 20° C. to the suspension of step (a), and (c) treating the suspension of step (a) with carbon dioxide before, during or after step (b). According to another embodiment the surface-reacted calcium carbonate is obtained by a process comprising the steps of: (A) providing a natural or precipitated calcium carbonate, (B) providing at least one water-soluble acid, (C) providing gaseous $CO_2$, (D) contacting said natural or precipitated calcium carbonate of step (A) with the at least one acid of step (B) and with the $CO_2$ of step (C), characterised in that: (i) the at least one acid of step B) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt, and (ii) following contacting the at least one acid with natural or precipitated calcium carbonate, at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

"Natural ground calcium carbonate" (GCC) preferably is selected from calcium carbonate containing minerals selected from the group comprising marble, chalk, dolomite limestone and mixtures thereof. Natural ground calcium carbonate may comprise further naturally occurring components such as magnesium carbonate, alumino silicate etc.

In general, the grinding of natural ground calcium carbonate may be a dry or wet grinding step and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with carbon dioxide and at least one $H_3O^+$ ion donor by the same means as used for grinding natural calcium carbonate as described above.

According to one embodiment of the present invention, the natural or precipitated calcium carbonate is in form of particles having a weight median particle size $d_{50}$ of 0.05 to 10.0 μm, preferably 0.2 to 5.0 μm, more preferably 0.4 to 3.0 μm, most preferably 0.6 to 1.2 μm, especially 0.7 μm. According to a further embodiment of the present invention, the natural or precipitated calcium carbonate is in form of particles having a top cut particle size $d_{98}$ of 0.15 to 55 μm, preferably 1 to 40 μm, more preferably 2 to 25 μm, most preferably 3 to 15 μm, especially 4 μm.

The natural and/or precipitated calcium carbonate may be used dry or suspended in water. Preferably, a corresponding slurry has a content of natural or precipitated calcium carbonate within the range of 1 wt.-% to 90 wt.-%, more preferably 3 wt.-% to 60 wt.-%, even more preferably 5 wt.-% to 40 wt.-%, and most preferably 10 wt.-% to 25 wt.-% based on the weight of the slurry.

The one or more $H_3O^+$ ion donor used for the preparation of surface-reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acidic salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acidic salt, for example, $HSO_4^-$ or $H_2PO_4^-$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acidic salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to the preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, sulphurous acid, phosphoric acid, oxalic acid, $H_2PO_4$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably 0.05 to 1 and most preferably 0.1 to 0.58.

As an alternative, it is also possible to add the $H_3O^+$ ion donor to the water before the natural or precipitated calcium carbonate is suspended.

In a next step, the natural or precipitated calcium carbonate is treated with carbon dioxide. If a strong acid such as sulphuric acid or hydrochloric acid is used for the $H_3O^+$ ion donor treatment of the natural or precipitated calcium carbonate, the carbon dioxide is automatically formed. Alternatively or additionally, the carbon dioxide can be supplied from an external source.

$H_3O^+$ ion donor treatment and treatment with carbon dioxide can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein carbon dioxide is formed in situ, and thus, the carbon dioxide treatment will automatically be carried out simultaneously with the $H_3O^+$ ion donor treatment, followed by the additional treatment with carbon dioxide supplied from an external source.

Preferably, the concentration of gaseous carbon dioxide in the suspension is, in terms of volume, such that the ratio (volume of suspension):(volume of gaseous $CO_2$) is from 1:0.05 to 1:20, even more preferably 1:0.05 to 1:5.

In a preferred embodiment, the $H_3O^+$ ion donor treatment step and/or the carbon dioxide treatment step are repeated at least once, more preferably several times.

According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and carbon dioxide treatment, the pH of the aqueous suspension, measured at 20° C., naturally reaches a value of greater than 6.0, preferably greater than 6.5, more preferably greater than 7.0, even more preferably greater than 7.5, thereby preparing the surface-modified natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate is obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counterion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the one or more $H_3O^+$ ion donors and/or the carbon dioxide in the presence of at least one compound selected from the group consisting of silicate, silica, aluminium hydroxide, earth alkali aluminate such as sodium or potassium aluminate, magnesium oxide, or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the one or more $H_3O^+$ ion donors and/or carbon dioxide.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with the one or more $H_3O^+$ ion donors and carbon dioxide has already started. Further details about the preparation of the surface-modified natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface-reacted calcium carbonate may have different particle shapes, such as e.g. the shape of roses, golf balls and/or brains.

In a preferred embodiment, the surface-reacted calcium carbonate has a specific surface area of from 15 $m^2/g$ to 200 $m^2/g$, preferably from 27 $m^2/g$ to 180 $m^2/g$, more preferably from 30 $m^2/g$ to 160 $m^2/g$, even more preferably from 30 $m^2/g$ to 150 $m^2/g$ and most preferably from 30 $m^2/g$ to 120 $m^2/g$, measured using nitrogen and the BET method. For example, the surface-reacted calcium carbonate has a specific surface area of from 30 $m^2/g$ to 100 $m^2/g$, measured using nitrogen and the BET method. The BET specific surface area in the meaning of the present invention is defined as the surface area of the particles divided by the mass of the particles. As used therein the specific surface area is measured by adsorption using the BET isotherm (ISO 9277:2010) and is specified in $m^2/g$.

It is furthermore preferred that the surface-reacted calcium carbonate particles have a volume median grain diameter $d_{50}$ (vol) of from 1 to 75 μm, preferably from 2 to 50 μm, more preferably 3 to 40 μm, even more preferably from 4 to 30 μm, and most preferably from 5 to 15 μm.

It may furthermore be preferred that the surface-reacted calcium carbonate particles have a grain diameter $d_{98}$ (vol) of from 2 to 150 μm, preferably from 4 to 100 μm, more preferably 6 to 80 μm, even more preferably from 8 to 60 μm, and most preferably from 10 to 30 μm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$ (wt) value is thus the weight median particle size, i.e. 50 wt.-% of all grains are smaller than this particle size, and the $d_{50}$ (vol) value is the volume median particle size, i.e. 50 vol.-% of all grains are smaller than this particle size.

Volume median grain diameter $d_{50}$ was evaluated using a Malvern Mastersizer 2000 Laser Diffraction System. The $d_{50}$ or $d_{98}$ value, measured using a Malvern Mastersizer 2000 Laser Diffraction System, indicates a diameter value such that 50% or 98% by volume, respectively, of the particles have a diameter of less than this value. The raw data obtained by the measurement are analysed using the Mie theory, with a particle refractive index of 1.57 and an absorption index of 0.005.

The weight median grain diameter is determined by the sedimentation method, which is an analysis of sedimentation behaviour in a gravimetric field. The measurement is made with a Sedigraph™ 5100 or 5120, Micromeritics Instrument Corporation. The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and sonicated.

The processes and instruments are known to the skilled person and are commonly used to determine grain size of fillers and pigments.

The specific pore volume is measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm (~nm). The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal, and by taking the specific pore volume intruded by mercury into pores finer than the modal turning point, i.e. finer than the bi-modal point of inflection, the specific intraparticle pore volume is defined. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

Preferably, the surface-reacted calcium carbonate has an intra-particle intruded specific pore volume in the range from 0.1 to 2.3 $cm^3/g$, more preferably from 0.2 to 2.0 $cm^3/g$, especially preferably from 0.4 to 1.8 $cm^3/g$ and most preferably from 0.6 to 1.6 $cm^3/g$, calculated from mercury porosimetry measurement.

The intraparticle pore size of the surface-reacted calcium carbonate is preferably in a range of from 0.004 to 1.6 μm, more preferably in a range of from 0.005 to 1.3 μm, especially preferably from 0.006 to 1.15 μm and most preferably of 0.007 to 1.0 μm, e.g. 0.01 to 0.9 μm determined by mercury porosimetry measurement.

It is appreciated that the surface-reacted calcium carbonate can be provided in form of an aqueous suspension or in dry form.

If the surface-reacted calcium carbonate is provided in form of an aqueous suspension, the aqueous suspension preferably has a solids content in the range from 5 to 80 wt.-%, based on the total weight of the aqueous suspension. According to a preferred embodiment the solids content of the aqueous suspension is in the range from 10 to 70 wt.-%, more preferably in the range from 15 to 60 wt.-% and most preferably in the range from 15 to 40 wt.-%, based on the total weight of the aqueous suspension.

The term "aqueous" suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous suspension comprises at least one water-miscible organic solvent, the liquid phase of the aqueous suspension comprises the at least one water-miscible organic solvent in an amount of from 0.1 to 40.0 wt.-%, preferably from 0.1 to 30.0 wt.-%, more preferably from 0.1 to 20.0 wt.-% and most preferably from 0.1 to 10.0 wt.-%, based on the total weight of the liquid phase of the aqueous suspension. For example, the liquid phase of the aqueous suspension consists of water.

According to a preferred embodiment the aqueous suspension consists of water and the surface-reacted calcium carbonate.

Alternatively, the aqueous surface-reacted calcium carbonate suspension comprises further additives.

Additionally or alternatively, the aqueous surface-reacted calcium carbonate suspension comprises a dispersing agent, e.g. a polyacrylate.

Preferably, the surface-reacted calcium carbonate provided in step a) is a dry surface-reacted calcium carbonate. This embodiment is advantageous because the method can be carried out without the implementation of cost-intensive steps required for removing the solvent.

For example, the surface-reacted calcium carbonate provided in step a) has a moisture content of less than 10.0 wt.-% based on the dry weight of the surface-reacted calcium carbonate provided in step a).

In one embodiment, the surface-reacted calcium carbonate provided in step a) has a moisture content of from 0.01 wt.-% to 10.0 wt.-%, preferably from 0.01 wt.-% to 8.0 wt.-% and more preferably from 0.01 wt.-% to 6.0 wt.-% based on the dry weight of the surface-reacted calcium carbonate provided in step a).

Characterization of Step b): Provision of a Treatment Agent

According to step b) of the present invention, a treatment agent is provided. It is one requirement of the present invention that the treatment agent is selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof.

It is appreciated that the treatment agent can be one or more treatment agent(s).

In one embodiment of the present invention, the treatment agent comprises, preferably consists of, one kind of treatment agent. Alternatively, the treatment agent comprises, preferably consists of, two or more kinds of treatment agents. For example, the treatment agent comprises, preferably consists of, two or three kinds of treatment agents.

Preferably, the treatment agent comprises, more preferably consists of, one kind of treatment agent.

In one embodiment, the treatment agent is ascorbic acid. For example, ascorbic acid is preferably L-ascorbic acid and/or D-isoascorbic acid. It is appreciated that L-ascorbic acid is also known as (5R)-5-[(1S)-1,2-dihydroxyethyl]-3,4-dihydroxy-2(5H)-furanone. D-Isoascorbic acid is also known as (5R)-5-[(1R)-1,2-dihydroxyethyl]-3,4-dihydroxyfuran-2(5H)-one. In one embodiment, the treatment agent is L-ascorbic acid or D-isoascorbic acid, preferably L-ascorbic acid. In an alternative embodiment, the treatment agent is L-ascorbic acid and D-isoascorbic acid.

Additionally or alternatively, the treatment agent is a salt of ascorbic acid.

The salt of ascorbic acid is preferably a compound selected from the group consisting of sodium, potassium, calcium, palmitate and stearate salts thereof. For example, the treatment agent is a sodium, potassium and/or calcium salt of ascorbic acid.

Additionally or alternatively, the treatment agent is gallic acid. It is appreciated that gallic acid is also known as 3,4,5-trihydroxybenzoate and has the molecular formula $C_7H_6O_5$.

Additionally or alternatively, the treatment agent is a salt of gallic acid.

The salt of gallic acid is preferably a compound selected from the group consisting of sodium, potassium, calcium, magnesium and lithium salts thereof.

Additionally or alternatively, the treatment agent is selected from unsaturated fatty acids and/or salts of unsaturated fatty acids.

The term "unsaturated fatty acid" in the meaning of the present invention refers to straight chain or branched chain, unsaturated organic compounds composed of carbon and hydrogen. Said organic compound further contains a carboxyl group placed at the end of the carbon skeleton.

The unsaturated fatty acid is preferably selected from the group consisting of oleic acid, linoleic acid, linolenic acid, crotonic acid, myristoleic acid, palmitoleic acid, sapienic acid, elaidic acid, vaccenic acid, gadoleic acid, erucic acid, nervonic acid, ecosadienoic acid, docosadienoic acid, pinoleic acid, eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, and mixtures thereof. More preferably, the treatment agent being an unsaturated fatty acid is selected from the group consisting of myristoleic acid, palmitoleic acid, sapienic acid, oleic acid, elaidic acid, vaccenic acid, linoleic acid, a-linolenic acid and mixtures thereof. Most preferably, the treatment agent being an unsaturated fatty acid is oleic acid and/or linoleic acid, preferably oleic acid or linoleic acid, most preferably linoleic acid.

Additionally or alternatively, the treatment agent is a salt of an unsaturated fatty acid.

The term "salt of unsaturated fatty acid" refers to an unsaturated fatty acid, wherein the active acid group is partially or completely neutralized. The term "partially neutralized" unsaturated fatty acid refers to a degree of neutralization of the active acid groups in the range from 40 and 95 mol-% preferably from 50 to 95 mol-%, more preferably from 60 to 95 mol-% and most preferably from 70 to 95 mol-%. The term "completely neutralized" unsaturated fatty acid refers to a degree of neutralization of the active acid groups of >95 mol-%, preferably of >99 mol-%, more preferably of >99.8 mol-% and most preferably of 100 mol-%. Preferably, the active acid groups are partially or completely neutralized.

The salt of unsaturated fatty acid is preferably a compound selected from the group consisting of sodium, potassium, calcium, magnesium, lithium, strontium, primary amine, secondary amine, tertiary amine and ammonium salts thereof, whereby the amine salts are linear or cyclic. For example, the treatment agent is a salt of oleic acid and/or linoleic acid, preferably oleic acid or linoleic acid, most preferably linoleic acid.

The salt of the unsaturated fatty acid is preferably obtained by treating the unsaturated fatty acid with a base before the addition step c) in order to obtain the corresponding salt thereof.

The base may be selected from potassium hydroxide, lithium hydroxide, ammonium hydroxide and/or sodium hydroxide, and preferably is sodium hydroxide.

The addition of the at least one base to the unsaturated fatty acid can be accomplished by any conventional means known to the skilled person. Preferably, the addition may be carried out under mixing conditions. The skilled person will adapt these mixing conditions such as the mixing speed and temperature according to his process equipment.

The base may be added to the unsaturated fatty acid in an amount ranging of 0.1 to 100 mol-%, preferably in the range of 1 to 98 mol-%, more preferably in the range of 10 to 95 wt.-%, and most preferably in the range of 40 to 95 wt.-%, based on the unsaturated fatty acid.

Additionally or alternatively, the treatment agent is elemental iron.

The term "elemental iron" according to the present invention refers to the chemical element with the symbol Fe. The elemental iron is solid under standard ambient temperature and pressure (SATP) which refers to a temperature of 298.15 K (25° C.) and an absolute pressure of exactly 100 000 Pa (1 bar, 14.5 psi, 0.98692 atm).

For example, the elemental iron is a particulate powder iron having a volume median particle size $d_{50}$ ranging from 5 nm to 10 μm. Preferably, the elemental iron is a particulate powder iron having a volume median particle size $d_{50}$ ranging from 10 nm to 2 μm, and more preferably from 30 nm to 500 nm.

In one embodiment, the elemental iron is a particulate powder iron in the nm size range. For example, the elemental iron is a particulate powder iron having a volume median particle size $d_{50}$ ranging from 10 nm to 300 nm, preferably from 20 to 200 nm, and more preferably from 30 nm to 100 nm.

Additionally or alternatively, the treatment agent is an iron (II)-salt. The term "iron (II)-salt" according to the present invention refers to a ferrous salt wherein the iron has the oxidation number II. For example, the treatment agent being an iron (II)-salt is selected from the group consisting of iron(II) bromide, iron(II) chloride ($FeCl_2$), iron(II) fluoride, iron(II) iodide, iron(II) molybdate, iron(II) oxalate, iron(II) tetrafluoroborate, potassium hexacyanoferrate, iron (II) sulphate (anhydrous), iron(II) sulphate monohydrate, iron(II) sulphate heptahydrate, ammonium iron(II) sulphate (anhydrous), ammonium iron(II) sulphate hexahydrate and mixtures thereof. Preferably, the treatment agent being an iron (II)-salt is selected from the group consisting of iron(II) sulphate monohydrate, iron(II) sulphate heptahydrate, ammonium iron(II) sulphate hexahydrate, iron(II) chloride and mixtures thereof. Most preferably, the treatment agent being an iron (II)-salt is iron(II) sulphate heptahydrate and/or iron(II) chloride, preferably iron(II) sulphate heptahydrate or iron(II) chloride, most preferably iron(II) sulphate heptahydrate.

Additionally or alternatively, the treatment agent is an iron (II)-comprising oxide and/or iron (II, III)-comprising oxide. The term "iron (II)-comprising oxide" according to the present invention refers to a ferrous oxide wherein the iron has the oxidation number II. The term "iron (II, III)-comprising oxides" according to the present invention refers to a ferrous oxide wherein the iron has the oxidation number II and III. For example, the treatment agent being an iron (II)-comprising oxide is iron(II) oxide. For example, the treatment agent being an iron (II, III)-comprising oxide is iron(II) iron(III) oxide.

The treatment agent is preferably in "liquid" or "molten" form.

In one embodiment, the treatment agent is a (neat) liquid at 25° C. and ambient pressure.

Alternatively, the treatment agent is in molten form.

If the treatment agent is in solid form it can also be dissolved/dispersed/suspended in a solvent and added as solution or suspension or dispersion to the surface-reacted calcium carbonate in step c), i.e. as a liquid.

The solvent that may be used to dilute/dissolve/disperse/suspend the treatment agent may be water and/or an organic solvent that is miscible with water, for example, an organic solvent like methanol, ethanol, n-butanol, isopropanol, n-propanol, and mixtures thereof. According to a preferred embodiment the solvent consists of water. According to another preferred embodiment the solvent is a mixture of water and at least one organic solvent that is miscible with water. Preferably, the solvent is a mixture consisting of water and ethanol and more preferably the water:ethanol mixture has a ratio from 2:1 to 1:2, based on the weight of the solvents and most preferably the water:ethanol mixture has a ratio of 1:1, based on the weight of the solvents.

According to one embodiment of the present invention the solids content of the diluted/dispersed suspension/dispersion comprising the solvent and the treatment agent is in the range from 0.1 to 60 wt.-%, preferably in the range from 1 to 40 wt.-%, more preferably in the range from 1.5 to 30 wt.-%, and most preferably in the range from 2 to 25 wt.-%, based on the total weight of the suspension/dispersion.

According to another embodiment of the present invention the amount of the treatment agent in the diluted/dissolved/dispersed/suspended solution/suspension/dispersion comprising the solvent and the treatment agent is in the range from 0.1 to 60 wt.-%, preferably in the range from 1 to 40 wt.-%, more preferably in the range from 1.5 to 30 wt.-%, and most preferably in the range from 2 to 25 wt.-%, based on the total weight of the solution/suspension/dispersion.

According to another embodiment of the present invention the treatment agent or the diluted/dissolved/dispersed solution/suspension/dispersion comprising the solvent and the at least one treatment agent is preheated, before combining step c) is carried out. That is to say, the treatment agent or the diluted/dissolved/dispersed solution/suspension/dispersion comprising the solvent and the treatment agent is treated at a temperature of from 30 to 120° C., preferably of from 45 to 115° C., more preferably of from 50 to 105° C. and most preferably of from 80 to 100° C. before combining step c) is carried out.

The treatment time for carrying out the preheating of the treatment agent or the diluted/dissolved/dispersed solution/suspension/dispersion comprising the solvent and the treatment agent is carried out for a period of 30 min or less, preferably for a period of 20 min or less and more preferably for a period of 15 min or less.

According to another embodiment of the present invention the treatment agent or the diluted/dissolved/dispersed solution/suspension/dispersion comprising the solvent and the treatment agent is preheated at a temperature of from 30 to 120° C., preferably of from 45 to 115° C., more preferably of from 50 to 105° C. and most preferably of from 80 to 100° C. before addition step c) is carried out for a period of 30 min or less, preferably for a period of 20 min or less and more preferably for a period of 15 min or less.

In one embodiment of the present invention, the preheating of the treatment agent or the diluted/dissolved/dispersed solution/suspension/dispersion comprising the solvent and the treatment agent is carried out at a temperature that is of about equal to the temperature implemented during combining step c).

The term "equal" temperature in the meaning of the present invention refers to a preheating temperature that is at most 20° C., preferably at most 15° C., more preferably 10° C. and most preferably at most 5° C., below or above the temperature implemented during combining step c).

The preheating of the treatment agent or the diluted/dissolved/dispersed solution/suspension/dispersion comprising the solvent and the treatment agent preferably takes place under mixing conditions. The skilled man will adapt these mixing conditions (such as the configuration of mixing pallets and mixing speed) according to his process equipment.

Characterization of Step c): Combining the Surface-Reacted Calcium Carbonate with the Treatment Agent According to step c) of the present invention, the surface-reacted calcium carbonate of step a) is combined with the treatment agent of step b) in one or more steps at a temperature of from 10 to 200° C. under mixing, such that the total weight of the treatment agent added is from 0.01 to 40 mg/m², based on the surface-reacted calcium carbonate of step a).

It is required that the treatment agent is added to the surface-reacted calcium carbonate of step a) such that the total weight of the treatment agent added is from 0.01 to 40 mg/m², based on the surface-reacted calcium carbonate of step a).

For example, the treatment agent is added to the surface-reacted calcium carbonate of step a) such that the total weight of the treatment agent added in step c) is from 0.1 to 40 mg/m² and preferably from 0.5 to 20 mg/m², based on the surface-reacted calcium carbonate of step a). Most preferably, the treatment agent is added to the surface-reacted calcium carbonate of step a) such that the total weight of the treatment agent added in step c) is from 0.7 to 15 mg/m², based on the surface-reacted calcium carbonate of step a).

Additionally or alternatively, the treatment agent of step b) is added in step c) in an amount of from 0.01 to 80.0 wt.-%, based on the total dry weight of the surface-reacted calcium carbonate of step a). Preferably, the treatment agent of step b) is added in step c) in an amount of from 0.1 to 70.0 wt.-%, more preferably from 0.5 to 60.0 wt.-% and most preferably from 1.0 to 40.0 wt.-%, based on the total dry weight of surface-reacted calcium carbonate of step a).

The step of combining the surface-reacted calcium carbonate of step a) with the treatment agent of step b), in one or more steps, preferably takes place under mixing conditions. The skilled man will adapt these mixing conditions (such as the configuration of mixing pallets and mixing speed) according to his process equipment.

For example, the mixing may take place by means of a ploughshare mixer. Ploughshare mixers function by the principle of a fluidized bed produced mechanically. Ploughshare blades rotate close to the inside wall of a horizontal cylindrical drum and convey the components of the mixture out of the product bed and into the open mixing space. The fluidized bed produced mechanically ensures intense mixing of even large batches in a very short time. Choppers and/or dispersers are used to disperse lumps in a dry operation. Equipment that may be used in the inventive process is available, for example, from Gebrüder Lödige Maschinenbau GmbH, Germany or from VISCO JET Rührsysteme GmbH, Germany.

In one embodiment of the present invention, the method is carried out in a continuous mode. In this case, it is possible to add the treatment agent to the surface-reacted calcium carbonate of step a) in a constant flow such that a constant concentration of the treatment agent is provided during step c).

Alternatively, the treatment agent is added to the surface-reacted calcium carbonate of step a) in one step, wherein said treatment agent is preferably added in one portion.

In another embodiment, the inventive method is carried out in a batch mode, i.e. the treatment agent is added to the surface-reacted calcium carbonate of step a) in more than one step, wherein said treatment agent is preferably added in about equal portions. Alternatively, it is also possible to add the treatment agent in unequal portions to the aqueous surface-reacted calcium carbonate of step a), i.e. in larger and smaller portions.

According to one embodiment of the present invention, step c) is carried out in a batch or continuous process for a period of time from 0.1 to 1 000 s. For example, step c) is a continuous process and comprises one or several contacting steps and the total contacting time is from 0.1 to 20 s, preferably from 0.5 to 15 s and most preferably from 1 to 10 s.

In order to obtain a sufficient combining of the surface-reacted calcium carbonate of step a) with the treatment agent of step b), it is required that combining step c) is carried out at a temperature of from 10 to 200° C. For example, combining step c) is carried out at a temperature of from 20 to 150° C., more preferably from 20 to 120° C., even more preferably from 20 to 100° C. and most preferably from 20 to 80° C. It is appreciated that the temperature at which combining step c) is carried out is preferably adapted to the specific treatment agent used. In this regard, it is to be noted that the treatment agent of step b) should be in liquid form, i.e. a neat liquid or a diluted/dissolved/dispersed solution/suspension/dispersion, or in molten form.

If the treatment agent of step b) is in form of a neat liquid or a diluted/dissolved solution at 25° C. and ambient pressure, combining step c) is thus preferably carried out at a temperature of from 10 to 40° C., preferably of from 20 to 40° C., more preferably of from 25 to 35° C., and most preferably of about 30° C. (±2° C.).

Alternatively, if the treatment agent of step b) is in molten form or a dispersed suspension/dispersion, combining step c) is preferably carried out at a temperature of from 40 to 200° C., preferably of from 50 to 150° C., more preferably of from 60 to 120° C. and most preferably of from 80 to 120° C. before step c) is carried out.

According to one embodiment, the surface-reacted calcium carbonate provided step a) and/or the treatment agent of step b) is/are preheated, before step c) is carried out. For example, the surface-reacted calcium carbonate provided step a) or the treatment agent of step b) is preheated, before step c) is carried out. Preferably, the surface-reacted calcium carbonate provided step a) is preheated, before step c) is carried out.

For example, the surface-reacted calcium carbonate provided in step a) is preheated, before step c) is carried out. That is to say, the surface-reacted calcium carbonate of step a) is preheated at a temperature of from 30 to 150° C., preferably of from 40 to 140° C., more preferably of from 50 to 130° C. and most preferably of from 80 to 120° C. before step c) is carried out. For example, the surface-reacted calcium carbonate of step a) is preheated to a temperature of 120° C.±5° C.

The treatment time for carrying out the preheating of the surface-reacted calcium carbonate of step a) is carried out for a period of 30 min or less, preferably for a period of 20 min or less and most preferably for a period of 15 min or less, e.g. 5 min to 15 min.

According to one embodiment of the present invention the surface-reacted calcium carbonate of step a) is preheated to a temperature of from 30 to 150° C., preferably of from 40 to 140° C., more preferably of from 50 to 130° C. and most preferably of from 80 to 120° C. before step c) is carried out for a period of 30 min or less, preferably for a period of 20 min or less and most preferably for a period of 15 min or less, e.g. 5 min to 15 min.

In one embodiment of the present invention, the preheating of the surface-reacted calcium carbonate of step a) is carried out at a temperature that is about equal to the temperature implemented during combining step c).

The term "equal" temperature in the meaning of the present invention refers to a preheating temperature that is at most 20° C., preferably at most 15° C., more preferably 10° C. and most preferably at most 5° C., below or above the temperature implemented during combining step c).

The preheating of the surface-reacted calcium carbonate of step a) preferably takes place under mixing conditions. The skilled man will adapt these mixing conditions (such as the configuration of mixing pallets and mixing speed) according to his process equipment.

In one embodiment, combining step c) is carried out for at least 1 min, preferably for at least 5 min, e.g. for at least 10 min, 15 min, 20 min, 30 min or 45 min. Additionally or alternatively, combining step c) is carried out for at most 60 min, preferably for at most 45 min, e.g. for at most 30 min.

For example, combining step c) is carried out for a period of time ranging from 1 min to 60 min, preferably for a period of time ranging from 10 min to 45 min, and most preferably from 10 min to 30 min. For example, the combining step c) is carried out for 20 min±5 minutes.

It is appreciated that combining step c) is preferably carried out at a temperature in the range from 20 to 200° C. and for a period of time ranging from 1 min to 60 min.

According to one aspect, the present invention thus refers to a method for the treatment of a surface-reacted calcium carbonate, the method comprises the following steps:
a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;
b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and
c) combining the surface-reacted calcium carbonate of step a) with the treatment agent of step b) in one or more steps at a temperature of from 10 to 200° C. under mixing, such that the total weight of the treatment agent added is from 0.01 to 40 mg/m$^2$, based on the surface-reacted calcium carbonate of step a).

According to a preferred embodiment, the present invention refers to a method for the treatment of a surface-reacted calcium carbonate, the method consists of the following steps:
a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;
b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and
c) combining the surface-reacted calcium carbonate of step a) with the treatment agent of step b) in one or more steps at a temperature of from 10 to 200° C. under mixing, such that the total weight of the treatment agent added is from 0.01 to 40 mg/m$^2$, based on the surface-reacted calcium carbonate of step a).

The inventors surprisingly found out that by the foregoing method it is possible to prepare a treated surface-reacted calcium carbonate that provides a highly efficient oxygen ($O_2$) scavenging, and especially an improved oxygen ($O_2$) scavenging in comparison to already known oxygen scavenger materials. Furthermore, by the method according to the present invention a treated surface-reacted calcium carbonate is provided that provides a long lasting oxygen ($O_2$) scavenging effect and/or is capable of removing a high amount of oxygen from the surrounding. Furthermore, by the method according to the present invention a treated surface-reacted calcium carbonate is provided that is non-toxic, can be easily handled and can be used in a great variety of applications.

Further Process Steps

According to one embodiment of the present invention, the method comprises a further step d) of treating the surface-reacted calcium carbonate obtained in step c) with at least one supplemental agent which is a hydrophobising agent.

The at least one hydrophobising agent used in step d) may be any agent known to the skilled person which is capable to form a hydrophobic treatment layer on at least a part of the accessible surface area of the surface-reacted calcium carbonate particles obtained in step c).

The term "at least one" hydrophobising agent in the meaning of the present invention means that the hydrophobising agent comprises, preferably consists of, one or more hydrophobising agents.

In one embodiment of the present invention, the at least one hydrophobising agent comprises, preferably consists of, one hydrophobising agent. Alternatively, the at least one hydrophobising agent comprises, preferably consists of, two or more hydrophobising agents. For example, the at least one hydrophobising agent comprises, preferably consists of, two or three hydrophobising agents.

Preferably, the at least one hydrophobising agent comprises, more preferably consists of, one hydrophobising agent.

The at least one hydrophobising agent is preferably selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof.

Suitable aliphatic carboxylic acids for treating the surface-reacted calcium carbonate obtained in step c) are for example aliphatic linear or branched carboxylic acids having between 4 and 24 carbon atoms.

The aliphatic linear or branched carboxylic acid in the meaning of the present invention may be selected from one or more straight chain, branched chain, saturated, unsaturated and/or alicyclic carboxylic acids. Preferably, the aliphatic linear or branched carboxylic acid is a monocarboxylic acid, i.e. the aliphatic linear or branched carboxylic acid is characterized in that a single carboxyl group is present. Said carboxyl group is placed at the end of the carbon skeleton.

In one embodiment of the present invention, the aliphatic linear or branched carboxylic acid is selected from saturated unbranched carboxylic acids, that is to say the aliphatic linear or branched carboxylic acid is preferably selected from the group of carboxylic acids consisting of butanoic acid, pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosanoic acid, behenic acid, tricosanoic acid, lignoceric acid and mixtures thereof.

In another embodiment of the present invention, the aliphatic linear or branched carboxylic acid is selected from the group consisting of octanoic acid, decanoic acid, lauric acid, myristic acid, palmitic acid, stearic acid, arachidic acid and mixtures thereof. Preferably, the aliphatic linear or branched carboxylic acid is selected from the group consisting of myristic acid, palmitic acid, stearic acid and mixtures thereof.

For example, the aliphatic linear or branched carboxylic acid is stearic acid.

Additionally or alternatively, the at least one hydrophobising agent is a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or a phosphoric acid ester blend of one or more phosphoric acid mono-ester and one or more phosphoric acid di-ester.

The step d) of treating the surface-reacted calcium carbonate obtained in step c) with a mono-substituted succinic anhydride and/or with a phosphoric acid ester blend and suitable compounds for coating are described in EP 2 722 368 A1 and EP 2 770 017 A1, which are thus incorporated herewith by references.

Additionally or alternatively, the at least one hydrophobising agent is an inert silicone oil such as a polydialkylsiloxane, as e.g. described in US 2004/0097616 A1.

Most preferred inert silicone oils are selected from the group consisting of polydimethylsiloxane, preferably dimethicone, polydiethylsiloxane and polymethylphenylsiloxane and/or mixtures thereof.

The inert silicone oil is preferably present in a quantity such that the total amount of said inert silicone oil on at least a part of the surface of the surface-reacted calcium carbonate obtained in step c), is less than 1 000 ppm, more preferably less than 800 ppm and most preferably less than 600 ppm. For example, the total amount of the inert silicone oil on at least a part of the surface of the surface-reacted calcium carbonate obtained in step c), is from 100 to 1 000 ppm, more preferably from 200 to 800 ppm and most preferably from 300 to 600 ppm, e.g. from 400 to 600 ppm.

Additionally or alternatively, the at least one hydrophobising agent is a polyhydrogensiloxane, preferably a poly(methylhydrosiloxane).

Additionally or alternatively, the at least one hydrophobising agent is an aliphatic fatty aldehyde.

The step d) of treating the surface-reacted calcium carbonate obtained in step c) with an aliphatic fatty aldehyde for coating is described in EP 2 390 285 A1, which is thus incorporated herewith by references.

If the method comprises step d), it is appreciated that step d) is carried out after combining step c).

According to one embodiment, the present invention thus refers to a method for the treatment of a surface-reacted calcium carbonate, the method comprises, preferably consists of, the following steps:

a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;

b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, c) combining the surface-reacted calcium carbonate of step a) with the treatment agent of step b) in one or more steps at a temperature of from 10 to 200° C. under mixing, such that the total weight of the treatment agent added is from 0.01 to 40 mg/m², based on the surface-reacted calcium carbonate of step a), and d) treating the surface-reacted calcium carbonate obtained in step c) with at least one supplemental agent which is a hydrophobising agent, preferably the hydrophobising agent is selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof.

According to one embodiment of the present invention, the method comprises a further step e) of encapsulating the surface-reacted calcium carbonate obtained in step c) or d).

It is thus appreciated that step e) of encapsulating the surface-reacted calcium carbonate is carried out after step c) or, if present, step d). That is to say, if the method comprises step d), encapsulating step e) is carried out after step d).

For example, the method comprises a further step e) of encapsulating the surface-reacted calcium carbonate obtained in step c) or d) with a wax, preferably with a paraffin wax.

The term "encapsulating" in the meaning of the present invention refers to the essentially complete encapsulation of the surface-reacted calcium carbonate with a suitable compound.

The step of encapsulating the surface-reacted calcium carbonate of step c) or d) can be carried out by any process known to the skilled man that is suitable for encapsulation. The skilled man will adapt the encapsulating conditions according to his process equipment.

For example, the encapsulating of the surface-reacted calcium carbonate of step c) or d) may take place by means of a ploughshare mixer.

According to one embodiment, the present invention thus refers to a method for the treatment of a surface-reacted calcium carbonate, the method comprises, preferably consists of, the following steps:

a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;

b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, c) combining the surface-reacted calcium carbonate of step a) with the treatment agent of step b) in one or more steps at a temperature of from 10 to 200° C. under mixing, such that the total weight of the treatment agent added is from 0.01 to 40 mg/m², based on the surface-reacted calcium carbonate of step a), d) optionally treating the surface-reacted calcium carbonate obtained in step c) with at least one supplemental agent which is a hydrophobising agent, preferably the hydrophobising agent is selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof, and e) encapsulating the surface-reacted calcium carbonate obtained in step c) or, if present, step d), preferably with a wax, more preferably with a paraffin wax.

In one embodiment, the surface-reacted calcium carbonate obtained in step c) or step d) or step e) is dried. This optional step is preferably carried out in order to reduce the moisture content of the surface-reacted calcium carbonate. Thus, the dried surface-reacted calcium carbonate has a moisture content that is below the moisture content of the surface-reacted calcium carbonate before the drying step.

According to one embodiment of the present invention, the method thus comprises a further step 0 of drying the surface-reacted calcium carbonate obtained in step c) or step d) or step e), preferably the surface-reacted calcium carbonate obtained in step c).

For example, optional drying step f) is carried out at a temperature in the range from 40 to 200° C., preferably from 50 to 150° C., more preferably from 60 to 120° C. and most preferably from 80 to 120° C., at ambient or reduced pressure until the moisture content of the obtained surface-treated calcium carbonate is in the range from 0.001 to 20 wt.-%, based on the total weight of the surface-reacted calcium carbonate.

It is appreciated that optional drying step f) can be carried out at ambient pressure or at reduced pressure. Preferably, the drying is carried out at ambient pressure.

Thus, optional drying step f) is preferably carried out at a temperature in the range from 40 to 200° C. at ambient pressure. For example, optional drying step f) is carried out at a temperature in the range from 50 to 150° C., preferably from 60 to 120° C. and more preferably from 80 to 120° C. at ambient pressure.

In one embodiment, optional drying step f) is carried out until the moisture content of the obtained surface-reacted calcium carbonate is in the range from 0.005 to 15 wt.-%, preferably in the range from 0.01 to 10 wt.-% and more preferably from 0.05 to 5 wt.-%, based on the total weight of the surface-reacted calcium carbonate.

According to one embodiment, the present invention thus refers to a method for the treatment of a surface-reacted calcium carbonate, the method comprises, preferably consists of, the following steps:

a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;

b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, c) combining the surface-reacted calcium carbonate of step a) with the treatment agent of step b) in one or more steps at a temperature of from 10 to 200° C. under mixing, such that the total weight of the treatment agent added is from 0.01 to 40 mg/m², based on the surface-reacted calcium carbonate of step a), d) optionally treating the surface-reacted calcium carbonate obtained in step c) with at least one supplemental agent which is a hydrophobising agent, preferably the hydrophobising agent is selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof, e) optionally encapsulating the surface-reacted calcium carbonate obtained in step c) or, if present, step d), preferably with a wax, more preferably with a paraffin wax, and f) drying the surface-reacted calcium carbonate obtained in step c) or step d) or step e).

Treated Surface-Reacted Calcium Carbonate

According to one aspect of the present invention, a treated surface-reacted calcium carbonate is provided.

The treated surface-reacted calcium carbonate comprises a) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source, and b) a treatment agent is located as a treatment layer on at least a part of the surface of the surface-reacted calcium carbonate and/or the treatment agent is loaded into at least a part of the pores as a pore filler of the surface-reacted calcium carbonate, wherein i) the treatment layer or the pore filler consists of a treatment agent selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and/or reaction products thereof, and ii) the total weight of the treatment agent on the total surface area or in the pores of the surface-reacted calcium carbonate is from 0.01 to 40 mg/m², based on the surface-reacted calcium carbonate of step a).

In one embodiment the treated surface-reacted calcium carbonate consists of a) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source, and b) a treatment agent is located as a treatment layer on at least a part of the surface of the surface-reacted calcium carbonate and/or the treatment agent is loaded into at least a part of the pores as a pore filler of the surface-reacted calcium carbonate, wherein i) the treatment layer or the pore filler consists of a treatment agent selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and/or reaction products thereof, and ii) the total weight of the treatment agent on the total surface area or in the pores of the surface-reacted calcium carbonate is from 0.01 to 40 mg/m$^2$, based on the surface-reacted calcium carbonate of step a).

It is appreciated that the treated surface-reacted calcium carbonate is preferably obtained by the process according to the present invention.

Thus, the treated surface-reacted calcium carbonate of the present invention is obtainable by a process comprising, preferably consisting of, the following steps:

a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;

b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and c) combining the surface-reacted calcium carbonate of step a) with the treatment agent of step b) in one or more steps at a temperature of from 10 to 200° C. under mixing, such that the total weight of the treatment agent added is from 0.01 to 40 mg/m$^2$, based on the surface-reacted calcium carbonate of step a).

In one embodiment, the treated surface-reacted calcium carbonate of the present invention is obtainable by a process comprising, preferably consisting of, the following steps a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;

b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, c) combining the surface-reacted calcium carbonate of step a) with the treatment agent of step b) in one or more steps at a temperature of from 10 to 200° C. under mixing, such that the total weight of the treatment agent added is from 0.01 to 40 mg/m$^2$, based on the surface-reacted calcium carbonate of step a), d) optionally treating the surface-reacted calcium carbonate obtained in step c) with at least one supplemental agent which is a hydrophobising agent, preferably the hydrophobising agent is selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof, e) optionally encapsulating the surface-reacted calcium carbonate obtained in step c) or, if present, step d), preferably with a wax, more preferably with a paraffin wax, and f) optionally drying the surface-reacted calcium carbonate obtained in step c) or step d) or step e).

With regard to the definition of the surface-reacted calcium carbonate, the treatment agent, the optional supplemental agent which is a hydrophobising agent, the optional encapsulating compound and preferred embodiments thereof, reference is made to the statements provided above when discussing the technical details of the method of the present invention.

The term "reaction products" in the meaning of the present invention refers to products obtained by contacting the surface-reacted calcium carbonate with the treatment agent, i.e. the treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof. Said reaction products are formed between at least a part of the applied treatment agent and reactive molecules located at the surface or in the pores of the surface-reacted calcium carbonate particles.

Preferably, the total weight of the treatment agent on the total surface area or in the pores of the surface-reacted calcium carbonate is from 0.01 to 40 mg/m$^2$. More preferably, the total weight of the treatment agent on the total surface area or in the pores of the surface-reacted calcium carbonate is from 0.1 to 20 mg/m$^2$ and most preferably from 0.2 to 15 mg/m$^2$.

Furthermore, the treated surface-reacted calcium carbonate of the inventions preferably has a specific moisture pick up susceptibility. It is preferred that the moisture pick up susceptibility of the treated surface-reacted calcium carbonate is such that its total surface moisture level is <100 mg/g, more preferably <60 mg/g and most preferably below <40 mg/g of the dry treated surface-reacted calcium carbonate. For example, the treated surface-reacted calcium carbonate has a moisture pick up susceptibility in the range from 0.05 to 100 mg/g, preferably from 0.1 to 60 mg/g and more preferably from 0.2 to 40 mg/g.

If the treated surface-reacted calcium carbonate is further treated with at least one supplemental agent which is a hydrophobising agent, the treated surface-reacted calcium carbonate further comprises said at least one supplemental agent which is a hydrophobising agent.

In one embodiment, the treated surface-reacted calcium carbonate thus further comprises at least one supplemental agent which is a hydrophobising agent which at least partially covers the treated surface-reacted calcium carbonate or is loaded into at least a part of the pores of treated surface-reacted calcium carbonate.

For example, the at least one hydrophobising agent is selected from the group consisting of an aliphatic carboxylic acid having a total amount of carbon atoms from $C_4$ to $C_{24}$ and/or salty reaction products thereof, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent and/or salty reaction products thereof, a phosphoric acid ester blend of one or more phosphoric acid mono-ester and/or reaction products thereof and one or more phosphoric acid di-ester and/or salty reaction products thereof, polyhydrogensiloxane and salty reaction products thereof, an inert silicone oil, preferably polydimethylsiloxane, an aliphatic fatty aldehyde and/or salty reaction products thereof and mixtures thereof.

With regard to the definition of the at least one supplemental agent which is a hydrophobising agent and preferred embodiments thereof, reference is made to the statements provided above when discussing the technical details of the method of the present invention.

The term "reaction products" with regard to the at least one supplemental agent which is a hydrophobising agent in the meaning of the present invention refers to products obtained by contacting the treated surface-reacted calcium carbonate with the at least one hydrophobising agent, i.e. the hydrophobising agent being selected from the group consisting of an aliphatic carboxylic acid having a total amount of carbon atoms from $C_4$ to $C_{24}$, a mono-substituted succinic anhydride consisting of succinic anhydride mono-substituted with a group selected from a linear, branched, aliphatic and cyclic group having a total amount of carbon atoms from at least $C_2$ to $C_{30}$ in the substituent, a phosphoric acid ester blend of one or more phosphoric acid mono-ester and one or more phosphoric acid di-ester, polyhydrogensiloxane, an inert silicone oil, preferably polydimethylsiloxane, an aliphatic fatty aldehyde and mixtures thereof. Said reaction products are formed between at least a part of the applied hydrophobising agent and reactive molecules located at the surface or in the pores of the treated surface-reacted calcium carbonate particles.

It is preferred that the total weight of the at least one supplemental agent which is a hydrophobising agent on the total surface area or in the pores of the treated surface-reacted calcium carbonate is below the total weight of the treatment agent which is located as a treatment layer on at least a part of the surface of the surface-reacted calcium carbonate and/or is loaded into at least a part of the pores as a pore filler of the surface-reacted calcium carbonate.

For example, the total weight of the at least one supplemental agent which is a hydrophobising agent on the total surface area or in the pores of the treated surface-reacted calcium carbonate is from 0.001 to 10 mg/m$^2$.

More preferably, the total weight of the at least one supplemental agent which is a hydrophobising agent on the total surface area or in the pores of the treated surface-reacted calcium carbonate is from 0.005 to 8 mg/m$^2$ and most preferably from 0.01 to 5 mg/m$^2$.

The inventors surprisingly found that the treated surface-reacted calcium carbonate of the present invention has excellent oxygen scavenging characteristics.

Use of the Treated Surface-Reacted Calcium Carbonate

According to another aspect of the present invention, the use of the treated surface-reacted calcium carbonate as oxygen scavenger is provided.

With regard to the definition of the treated surface-reacted calcium carbonate and preferred embodiments thereof, reference is made to the statements provided above when discussing the technical details of the treated surface-reacted calcium carbonate and the method of the present invention.

The inventors surprisingly found that the treated surface-reacted calcium carbonate provides a highly efficient oxygen ($O_2$) scavenging, and especially an improved oxygen ($O_2$) scavenging in comparison to already known oxygen scavenger materials. Furthermore, the treated surface-reacted calcium carbonate according to the present invention provides a long lasting oxygen ($O_2$) scavenging effect and/or is capable of removing a high amount of oxygen from the surrounding.

According to one embodiment of the present invention the total volume of oxygen reacted per gram of treatment agent is in the range from 0.01 to 100 mL per gram of surface treatment agent per day and preferably in the range from 0.1 to 50 mL per gram of surface treatment agent per day and more preferably in the range from 0.4 to 25 mL per gram of treatment agent per day, wherein the reaction with oxygen is carried out with 500 g dried treated surface-reacted calcium carbonate in a closed desiccator with a volume of 7 L filled with air under normal pressure.

In view of the oxygen scavenging properties of the treated surface-reacted calcium carbonate, the treated surface-reacted calcium carbonate can be used in a great variety of applications.

For example, the treated surface-reacted calcium carbonate can be used in polymer compositions, coatings, preferably paper- or polymer coatings, more preferably paper coatings, food applications, filter and/or cosmetic applications, preferably in food applications and more preferably in food packaging applications.

The scope and interest of the present invention will be better understood based on the following examples which are intended to illustrate certain embodiments of the present invention and are non-limitative.

EXAMPLES

1 Measurement Methods

Figure 1:
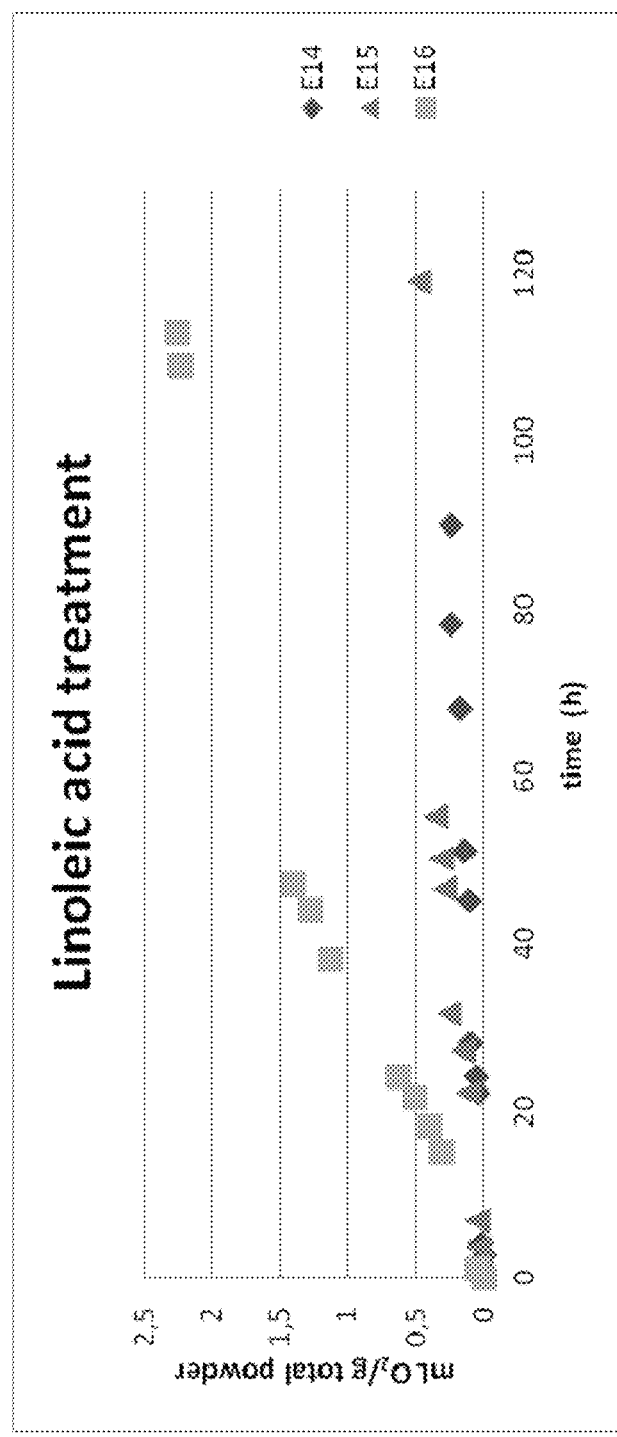
FIG. 1 shows the results of oxygen scavenging tests of linoleic acid treatment in Examples 14, 15, and 16, in terms of $O_2$ scavenged (mL $O_2$/g total powder).

In the following the measurement methods implemented in the examples are described.

Moisture Content of Calcium Carbonate

A 10 g powder sample was heated in an oven at 150° C. until the mass is constant for 20 minutes. The mass loss was determined gravimetrically and is expressed as wt.-% loss based on the initial sample mass. This mass loss has been attributed to the sample humidity.

Moisture Pick Up Susceptibility

The moisture pick up susceptibility of a material as referred to herein was determined in mg moisture/g after exposure to an atmosphere of 10 and 85% relative humidity, respectively, for 2.5 hours at a temperature of +23° C. (±2° C.). For this purpose, the sample was first kept at an atmosphere of 10% relative humidity for 2.5 hours, then the atmosphere is changed to 85% relative humidity at which the sample is kept for another 2.5 hours. The weight increase between 10 and 85% relative humidity was then used to calculate the moisture pick-up in mg moisture/g of sample.

The moisture pick up susceptibility in mg/g divided by the specific surface area in $m^2/g$ (calculated based on the specific surface area BET) corresponds to the "normalized moisture pick up susceptibility" expressed in $mg/m^2$ of sample.

Solids Content

The suspension solids content (also known as "dry weight") was determined using a Moisture Analyser MJ33 (Mettler-Toledo, Switzerland), with the following settings: drying temperature of 150° C., automatic switch off if the mass does not change more than 1 mg over a period of 30 sec, standard drying of 5 to 20 g of suspension.

Oxygen Scavenging Tests

Oxygen-scavenging tests were performed by placing a defined amount of powder in a closed desiccator equipped with an oxygen measuring device (GOX 100, GHM Messtechnik GmbH, Germany). The relative amount of oxygen in air was recorded regularly and the total amount of oxygen scavenged by gram of sample (or active substance) estimated, assuming the gas respect the ideal gas law, and neglecting the volume occupied by the powders. Results were expressed as mL $O_2$/g of powder, or mL $O_2$/g of active substance.

The following equations were used for the calculations:

$$n(\text{gas}) = \frac{PV}{R \cdot T}$$

$$n(O_2) = n(\text{gas}) \times 20.9/100$$

$$m(O_2) = n(O_2) \times M(O_2)$$

$$V(O_{2desiccator}) = V(\text{desiccator}) \times 20.9/100$$

Assuming

R=8.314 $J \cdot K^{-1} \cdot mol^{-1}$

T=295 K

P=101 300 Pa

M ($O_2$)=32 $g \cdot mol^{-1}$%

$O_2$ in air=20.9%

The values presented in the experimental section are calculated as follow:

$$O_2 \text{ scavenged (mL/g of powder)} = \frac{20.0 \, (\% \, O_2 \text{ measured})}{20.9} \times \frac{V_{O2desiccator}}{m(\text{powder})}$$

$O_2$ scavanged (mL/g of surface treatment agent) =

$$O_2 \text{ scavenged (mL/g of powder)} \times \frac{m(\text{surface treatment agent})}{m(\text{powder after treatment})}$$

Particle Size Distribution (Volume % Particles with a Diameter <X), $d_{50}$ Value (Volume Median Particle Diameter) and $d_{98}$ Value of a Particulate Material:

Volume median grain diameter $d_{50}$ was evaluated using a Malvern Mastersizer 2000 Laser Diffraction System (Malvern Instruments Plc., Great Britain) using the Mie theory, with a particle refractive index of 1.57 and an absorption index of 0.005. Alternatively, the measurement can be made with a HELOS particle-size-analyser of Sympatec, Germany. The measurement may be considered equivalent to weight distribution assuming a constant density throughout the particle size distribution, and reference is made to the measurement technique.

Weight median grain diameter and grain diameter weight distribution of a particulate material were determined via the sedimentation method, i.e. an analysis of sedimentation behaviour in a gravimetric field. The measurement was made with a Sedigraph TM 5120.

The method and instrument are known to the skilled person and are commonly used to determine grain size of fillers and pigments. The measurement is carried out in an aqueous solution of 0.1 wt-% $Na_4P_2O_7$. The samples were dispersed using a high speed mixer and ultrasound.

Intra Particle Intruded Specific Pore Volume

The intra-particle intruded specific pore volume has been calculated from a mercury intrusion porosimetry measurement using a Micromeritics Autopore IV 9500 mercury porosimeter having a maximum applied pressure of mercury 414 MPa (60 000 psi), equivalent to a Laplace throat diameter of 0.004 μm. The equilibration time used at each pressure step is 20 seconds. The sample material is sealed in a 5 $cm^3$ chamber powder penetrometer for analysis. The data are corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, p1753-1764.).

The total pore volume seen in the cumulative intrusion data can be separated into two regions with the intrusion data from 214 μm down to about 1-4 μm showing the coarse packing of the sample between any agglomerate structures contributing strongly. Below these diameters lies the fine interparticle packing of the particles themselves. If they also have intraparticle pores, then this region appears bi modal. The sum of these three regions gives the total overall pore volume of the powder, but depends strongly on the original sample compaction/settling of the powder at the coarse pore end of the distribution. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

BET Specific Surface Area of a Material

Throughout the present document, the specific surface area (in $m^2/g$) of the filler material is determined using the BET method (using nitrogen as adsorbing gas), which is well known to the skilled man (ISO 9277:2010). The total surface area (in $m^2$) of the filler material is then obtained by multiplication of the specific surface area and the mass (in g) of the filler material prior to treatment.

2 Preparation of Treated Surface-Reacted Calcium Carbonate

In the following description of the preparation of the Examples and Comparative Examples the indication of weight in form of "parts" always refers to "parts by weight", unless indicated otherwise.

2.1 Treatments with Unsaturated Fatty Acids 2.1.1 Example 1—Powder 1

600 g of surface-reacted calcium carbonate ($d_{50}$=2.4 μm, BET specific surface area=37 $m^2/g$) was placed in a high speed mixer (MTI Mixer, MTI Mischtechnik International GmbH, Germany), and conditioned by stirring for 10 minutes (3 000 rpm, 30° C.). Then, 0.6 parts relative to 100 parts surface-reacted calcium carbonate of linoleic acid (3.6 g, Sigma-Aldrich (Germany), technical grade 60-74%) was added and stirring was continued for another 20 minutes at 30° C. This treatment level corresponds to approx. 0.16 $mg/m^2$. Subsequently, the mixture was cooled down and taken out of the mixer. A white powder was collected (Powder 1).

2.1.2 Example 2—Powder 2

800 g of surface-reacted calcium carbonate ($d_{50}$=2.4 μm, BET specific surface area=37 $m^2/g$) was placed in a high speed mixer (MTI Mixer, MTI Mischtechnik International GmbH, Germany), and conditioned by stirring for 10 minutes (3 000 rpm, 30° C.). Then, 1.0 parts relative to 100 parts surface-reacted calcium carbonate of linoleic acid (8 g, Sigma-Aldrich (Germany), technical grade 60-74%) was added and stirring was continued for another 20 minutes at 30° C. This treatment level corresponds to approx. 0.27 $mg/m^2$. Subsequently, the mixture was cooled down and taken out of the mixer. A white powder was collected (Powder 2).

2.1.3 Example 3—Powder 3

700 g of surface-reacted calcium carbonate ($d_{50}$=2.4 μm, BET specific surface area=37 $m^2/g$) was placed in a high speed mixer (MTI Mixer, MTI Mischtechnik International GmbH, Germany), and conditioned by stirring for 10 minutes (3 000 rpm, 30° C.). Then, 3.0 parts relative to 100 parts surface-reacted calcium carbonate of linoleic acid (21 g, Sigma-Aldrich (Germany), technical grade 60-74%) was added and stirring was continued for another 20 minutes at 30° C. This treatment level corresponds to approx. 0.81 $mg/m^2$. Subsequently, the mixture was cooled down and taken out of the mixer. A white powder was collected (Powder 3).

2.1.4 Example 4—Powder 4

600 g of surface-reacted calcium carbonate ($d_{50}$=2.4 μm, BET specific surface area=37 $m^2/g$) was placed in a high speed mixer (MTI Mixer, MTI Mischtechnik International GmbH, Germany), and conditioned by stirring for 10 minutes (3 000 rpm, 30° C.). Then, 3.0 parts relative to 100 parts surface-reacted calcium carbonate of oleic acid (18 g, Fluka (Belgium)) was added and stirring was continued for another 20 minutes at 30° C. This treatment level corresponds to approx. 0.81 $mg/m^2$. Subsequently, the mixture was cooled down and taken out of the mixer. A white powder was collected (Powder 4).

2.1.5 Example 5—Powder 5

700 g of surface-reacted calcium carbonate ($d_{50}$=2.4 μm, BET specific surface area=37 $m^2/g$) was placed in a high speed mixer (MTI Mixer, MTI Mischtechnik International GmbH, Germany), and conditioned by stirring for 10 minutes (1 000 rpm, 30° C.). Then, 10 parts relative to 100 parts surface-reacted calcium carbonate of oleic acid (70 g, Fluka (Belgium)) was added and stirring was continued for 10 minutes at 30° C./2 000 rpm, followed by 10 minutes at 40° C./3 000 rpm, and finally 20 minutes at 80° C./3 000 rpm. This treatment level corresponds to approx. 2.70 $mg/m^2$. Subsequently, the mixture was cooled down and taken out of the mixer. A white powder was collected (Powder 5).

2.1.6 Example 6—Powder 6

500 g of surface-reacted calcium carbonate ($d_{50}$=2.4 μm, BET specific surface area=37 $m^2/g$) was placed in a Lödige mixer (M5 R-MK, Gebrüder Lödige Maschinenbau GmbH, Germany) at room temperature. Stirring was activated and 20 parts relative to 100 parts surface-reacted calcium carbonate of oleic acid (100 g, Fluka (Belgium)) was added dropwise with a peristaltic pump (addition time: approx. 1 h) and stirring was continued at room temperature for 1 hour after addition. This treatment level corresponds to approx. 5.41 $mg/m^2$. Subsequently, the mixture was taken out of the mixer. A white powder was collected (Powder 6).

2.1.7 Example 7—Slurry 7

To 500 g (100 parts) of powder 4 in a 2 L bottle was added 400 g deionized water, 120 g ethanol and 1.0 parts of a polyacrylate dispersant (11.9 g of a 42 wt.-% aqueous solution of a 100% sodium-neutralised polyacrylate, $M_w$=3 500 g/mol, pH=8) is added dropwise under strong stirring (930 rpm) at room temperature (Pendraulik stirrer). After the end of addition, stirring was continued for 10 minutes. The slurry was used without further modifications (Slurry 7).

2.2 Treatments with Ascorbic Acid

2.2.1 Example 8—Powder 8

300 g of surface-reacted calcium carbonate ($d_{50}$=2.4 μm, BET specific surface area=37 m$^2$/g) was placed in a Lödige mixer (M5 R-MK, Gebrüder Lödige Maschinenbau GmbH, Germany) at room temperature. Stirring was activated and 10 parts relative to 100 parts surface-reacted calcium carbonate of L-ascorbic acid (reagent grade, Sigma life science, China, 133 g of a previously prepared 22.6 wt.-% aqueous solution) was added dropwise with a peristaltic pump (addition time: approx. 20 minutes) and stirring was continued at room temperature for 20 minutes after addition. This treatment level corresponds to approx. 2.70 mg/m$^2$. Subsequently, the mixture was taken out of the mixer. A beige/brown powder was collected (Powder 8).

2.2.2 Example 9—Powder 9

300 g of dry surface-reacted calcium carbonate ($d_{50}$=4.5 μm, BET specific surface area=139 m$^2$/g) was placed in a Somakon mixer (Somakon Verfahrenstechnik UG, Germany) and conditioned by stirring at 30° C. for 10 minutes (300 rpm). Then, 5 parts relative to 100 parts surface-reacted calcium carbonate of D-isoascorbic acid (add origin, 15 g dissolved in 40 mL deionised water) was added dropwise over 15 minutes and stirring was continued at 30° C., 300 rpm for 20 minutes after addition. This treatment level corresponds to approx. 0.36 mg/m$^2$. Subsequently, the mixture was taken out of the mixer. A yellow/beige powder was collected (Powder 9).

2.3 Surface Treatments with Gallic Acid

2.3.1 Example 10—Powder 10

400 g of dry surface-reacted calcium carbonate ($d_{50}$=2.4 μm, BET specific surface area=37 m$^2$/g) was placed in a Lödige mixer (M5 R-MK, Gebrüder Lödige Maschinenbau GmbH, Germany) and heated to 100° C. Stirring was activated and 10 parts relative to 100 parts surface-reacted calcium carbonate of gallic acid (40 g dissolved in 160 g ethanol) was added dropwise with a peristaltic pump (addition time: approx. 1 h) and stirring was continued at 100° C. for 1 h after addition. This treatment level corresponds to approx. 2.70 mg/m$^2$. Subsequently, the mixture was taken out of the mixer and further dried in the oven (60° C., <20 mbar) for 1 h. A grey powder was collected (Powder 10).

2.4 Surface Treatments with Iron

2.4.1 Example 11—Powder 11

420 g of dry surface-reacted calcium carbonate ($d_{50}$=2.4 μm, BET specific surface area=37 m$^2$/g) was placed in a Lödige mixer (M5 R-MK, Gebrüder Lödige Maschinenbau GmbH, Germany) at room temperature. Stirring was activated and 4.8 parts relative to 100 parts surface-reacted calcium carbonate of iron sulphate heptahydrate (Sigma Aldrich, India, 90 g of a previously prepared 22.3 wt.-% aqueous solution) was added dropwise with a peristaltic pump (addition time: approx. 1 hour) and stirring was continued at room temperature for 20 minutes after addition. This treatment level corresponds to approx. 1.30 mg/m$^2$. Subsequently, the mixture was taken out of the mixer. A beige/brown powder was collected (Powder 11).

2.4.2 Example 12—Powder 12

300 g of dry surface-reacted calcium carbonate ($d_{50}$=2.4 μm, BET specific surface area=37 m$^2$/g) was placed in a Somakon mixer (Somakon Verfahrenstechnik UG, Germany) and conditioned by heating to 120° C. for 10 minutes (500 rpm). Then, 5 parts relative to 100 parts surface-reacted calcium carbonate of citric acid (Sigma-Aldrich, 15 g dissolved in 20 mL deionised water) was added dropwise and stirring was continued at 120° C., 500 rpm for 20 minutes after addition and immediately cooled down to 40° C.

In a second step, 3 parts relative to 100 parts surface-reacted calcium carbonate of iron nanopowder was added in portions (9 g, 60-80 nm particle size, Aldrich (China)), and stirring was continued for 20 minutes (40° C., 500 rpm). This treatment level corresponds to approx. 0.81 mg/m$^2$. Subsequently, the mixture was taken out of the mixer. A grey powder was collected (Powder 12).

2.5 Comparative Examples

2.5.1 Comparative Example 1—Powder CE1

Powder CE1 is untreated surface-reacted calcium carbonate ($d_{50}$=2.4 μm, BET specific surface area=37 m$^2$/g, intra-particle intruded specific pore volume=0.281 cm$^3$/g, humidity=1.58 wt.-%).

2.5.2 Comparative Example 2—CE2

Powder CE2 is commercially available linoleic acid (Sigma-Aldrich (Germany), technical grade 60-74%)

2.5.3 Comparative Example 3—CE3

CE3 is commercially available oleic acid (Fluka (Belgium))

2.5.4 Comparative Example 4—Powder CE4

Powder CE4 is commercially available (L)-Ascorbic acid crystalline powder (Sigma life science, reagent grade, China)

2.5.1 Comparative Example 5—Powder CE5

Powder CE5 is an untreated surface-reacted calcium carbonate ($d_{50}$=4.5 μm, BET specific surface area=139 m$^2$/g, intra-particle intruded specific pore volume=0.864 cm$^3$/g, humidity=6.77 wt.-%).

Table 1 summarizes the prepared surface-reacted calcium carbonates.

TABLE 1

Overview of prepared surface-reacted calcium carbonates

| Example | CaCO$_3$ (parts) | BET specific surface CaCO$_3$ (m$^2$/g) | Additive (parts) Linoleic acid | Oleic acid | (L-ascorbic acid) | Isoascorbic acid | Iron (nano) | Iron sulphate pentahydrate |
|---|---|---|---|---|---|---|---|---|
| 1 | 100 | 37 | 0.6 | — | — | — | — | — |
| 2 | 100 | 37 | 1 | — | — | — | — | — |
| 3 | 100 | 37 | 3 | — | — | — | — | — |
| 4 | 100 | 37 | — | 3 | — | — | — | — |
| 5 | 100 | 37 | — | 10 | — | — | — | — |
| 6 | 100 | 37 | — | 20 | — | — | — | — |
| 7 | 100 | | | | Slurry with powder 4 | | | |
| 8 | 100 | 37 | — | — | 10 | — | — | — |
| 9 | 100 | 139 | — | — | — | 5 | — | — |
| 10 | 100 | 37 | | | 10 parts gallic acid | | | |
| 11 | 100 | 37 | — | — | — | — | — | 4.8 |
| 12 | 100 | 37 | — | — | — | — | 3 (+5 citric acid) | — |
| CE1 | 100 | 37 | — | — | — | — | — | — |
| CE2 | — | — | 100 | — | — | — | — | — |
| CE3 | — | — | — | 100 | — | — | — | — |
| CE4 | — | — | — | — | 100 | — | — | — |
| CE5 | 100 | 139 | — | — | — | — | — | — |

Table 2 shows the results of several treated surface-reacted calcium carbonates with regard to the moisture pick-up susceptibility.

TABLE 2

Water pick-up susceptibility

| Example | Water pick-up (mg/g) |
|---|---|
| CE1 | 22.5 |
| CE5 | 69.7 |
| 2 | 14.5 |
| 3 | 11.5 |
| 5 | 6.2 |
| 6 | 6.2 |
| 8 | 32.7 |

3 Coating Colours Preparation and Paper Coating

Examples 13 (E13)

Coating colour containing 100 parts of CaCO$_3$ (w/w) and 6 parts (dry/dry) of a synthetic binder based on styrene-butadiene copolymers (Styronal D628 (BASF, Germany)) was then prepared with the slurry according to example 7 and coated on both sides of superYUPO® foils from Fischer Papier AG, Switzerland (thickness 80 µm, size: 18×26 cm$^2$, 62 g/m$^2$, polypropylene) and dried on a belt-drier (150° C.). After coating, the sheets were immediately stored in a closed plastic bag to limit oxygen exposure until use. The composition of the coating colours and coating weights are summarized in Table 3 below.

TABLE 3

Coating colour preparation and coating weight

| | | Coating colour composition | | | |
|---|---|---|---|---|---|
| Example | Slurry | CaCO$_3$ [parts] | Styronal D628 [parts, dry/dry] | Solids content [wt.-%] | Coating weight [g/m$^2$] |
| E13 | E7 | 100 | 6 | 48.8 | 68.9 |

4 Oxygen Scavenging Tests 4.1 Tests on Powders

Oxygen-scavenging tests were performed by placing a defined amount of powder in a well closed desiccator equipped with an oxygen measuring device (GOX 100, GHM Messtechnik GmbH, Germany). The relative amount of oxygen in air is regularly recorded and the total amount of oxygen scavenged by gram of sample estimated, assuming the gas respect the ideal gas law, and neglecting the volume occupied by the powder. Results are expressed as mL O$_2$/g of powder.

4.1.1 Example 14

500 g of the powder from Example 1 were placed in a closed desiccator having a volume of approx. 7 L, and O$_2$ amount was recorded regularly. This treatment level corresponds to approx. 0.16 mg/m$^2$. The results of the oxygen scavenging test are summarized in Table 4 below.

TABLE 4

| | Oxygen scavenging test | | | | | | | | | | |
|---|---|---|---|---|---|---|---|---|---|---|---|
| | Time [h] | | | | | | | | | | |
| | 0 | 2.6 | 4 | 22 | 24 | 28 | 45 | 51 | 68 | 78 | 90 |
| $O_2$ [%] in desiccator | 20.9 | 20.9 | 20.8 | 20.6 | 20.5 | 20.2 | 20.1 | 19.9 | 19.7 | 19.2 | 19.2 |
| $O_2$ scavenged (mL/g powder) | 0 | 0 | 0.014 | 0.042 | 0.056 | 0.098 | 0.112 | 0.14 | 0.168 | 0.238 | 0.238 |
| $O_2$ scavenged (mL/g linoleic acid) | 0 | 0 | 2.35 | 7.05 | 9.40 | 16.4 | 18.8 | 23.49 | 28.2 | 39.9 | 39.9 |

Figure 2:
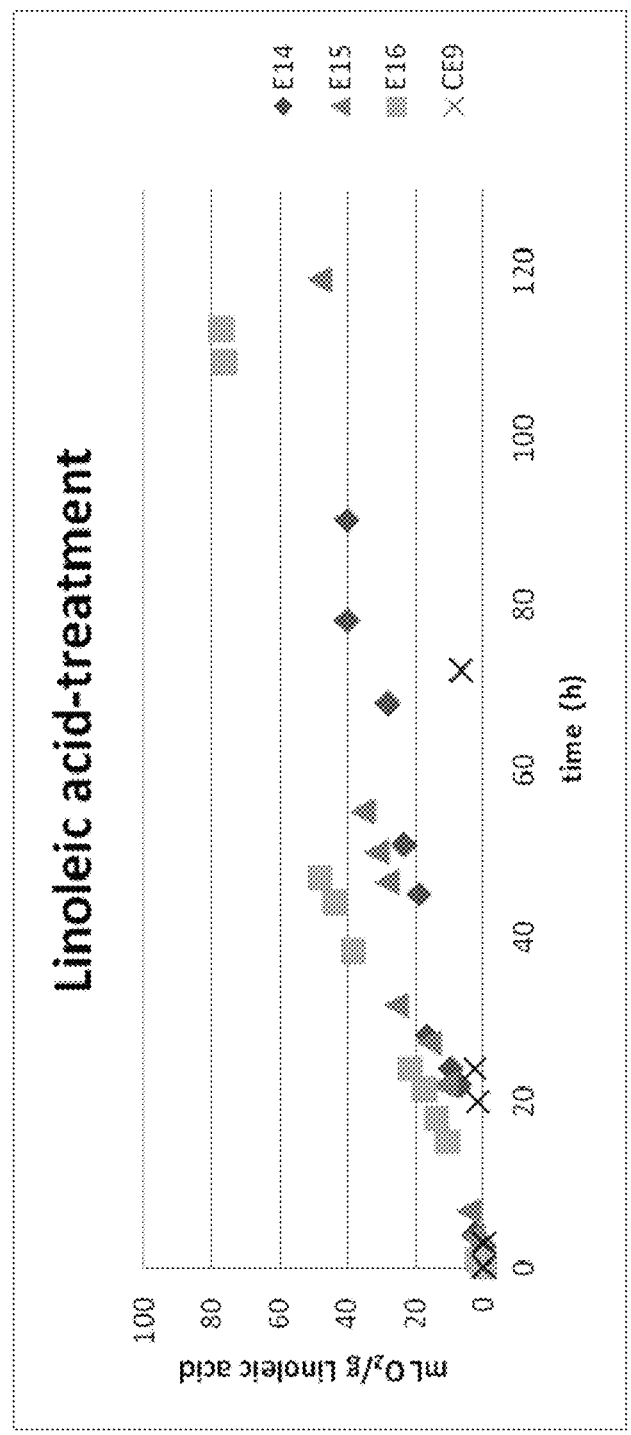
FIG. 2 shows the results of oxygen scavenging tests of linoleic acid treatment in Examples 14, 15, and 16, in terms of $O_2$ scavenged (mL $O_2$/g linoleic acid).

The results of Example 14 are also shown in FIGS. 1 and 2.

4.1.2 Example 15

500 g of the powder from Example 2 were placed in a closed desiccator having a volume of approx. 7 L, and $O_2$ amount was recorded regularly. This treatment level corresponds to approx. 0.27 mg/m². The results of the oxygen scavenging test are summarized in Table 5 below.

TABLE 5

| | Oxygen scavenging test | | | | | | | | | | |
|---|---|---|---|---|---|---|---|---|---|---|---|
| | Time [h] | | | | | | | | | | |
| | 0 | 1.5 | 3.6 | 6.75 | 22 | 27 | 31.5 | 46.5 | 50 | 55 | 119 |
| $O_2$ [%] in desiccator | 20.9 | 20.8 | 20.7 | 20.6 | 20.1 | 19.8 | 19.1 | 18.9 | 18.7 | 18.4 | 17.5 |
| $O_2$ scavenged (mL/g powder) | 0 | 0.014 | 0.028 | 0.042 | 0.112 | 0.154 | 0.252 | 0.28 | 0.308 | 0.35 | 0.476 |
| $O_2$ scavenged (mL/g linoleic acid) | 0 | 1.41 | 2.83 | 4.24 | 11.3 | 15.6 | 25.5 | 28.28 | 31.1 | 35.4 | 48.1 |

The results of Example 15 are also shown in FIGS. 1 and 2.

4.1.3 Example 16

500 g of the powder from Example 3 were placed in a closed desiccator having a volume of approx. 7 L, and $O_2$ amount was recorded regularly. This treatment level corresponds to approx. 0.81 mg/m². The results of the oxygen scavenging test are summarized in Table 6 below.

TABLE 6

| | Oxygen scavenging test | | | | | | | | | | |
|---|---|---|---|---|---|---|---|---|---|---|---|
| | Time [h] | | | | | | | | | | |
| | 0 | 1 | 15 | 18 | 21.5 | 24 | 38 | 44 | 47 | 109 | 113 | 161 |
| $O_2$ [%] in desiccator | 20.9 | 20.6 | 18.7 | 18.1 | 17.3 | 16.4 | 12.9 | 11.8 | 10.9 | 5 | 4.8 | 4.6 |
| $O_2$ scavenged (mL/g powder) | 0 | 0.042 | 0.308 | 0.392 | 0.504 | 0.63 | 1.12 | 1.274 | 1.4 | 2.23 | 2.25 | 2.28 |
| $O_2$ scavenged (mL/g linoleic acid) | 0 | 1.44 | 10.6 | 13.5 | 17.3 | 21.6 | 38.5 | 43.8 | 48.1 | 76.4 | 77.4 | 78.4 |

The results of Example 16 are also shown in FIGS. 1 and 2.

4.1.4 Example 17

500 g of the powder from Example 4 were placed in a closed desiccator having a volume of approx. 7 L, and $O_2$ amount was recorded regularly. This treatment level corresponds to approx. 0.81 mg/m². The results of the oxygen scavenging test are summarized in Table 7 below.

TABLE 7

Oxygen scavenging test

| | Time [h] | | | | | | | | | | |
|---|---|---|---|---|---|---|---|---|---|---|---|
| | 0 | 1.5 | 3.5 | 6 | 20 | 27 | 29 | 46 | 54 | 69 | 73 |
| O₂ [%] in desiccator | 20.9 | 20.6 | 20.4 | 20.1 | 19.7 | 19.2 | 18.9 | 18.2 | 17.7 | 17.2 | 17 |
| O₂ scavenged (mL/g powder) | 0 | 0.042 | 0.07 | 0.112 | 0.168 | 0.238 | 0.28 | 0.378 | 0.448 | 0.518 | 0.546 |
| O₂ scavenged (mL/g oleic acid) | 0 | 1.44 | 2.40 | 3.85 | 5.77 | 8.17 | 9.62 | 13.0 | 15.4 | 17.8 | 18.8 |

| | Time [h] | | | | | | | | | |
|---|---|---|---|---|---|---|---|---|---|---|
| | 77 | 100 | 166 | 172 | 190 | 194 | 210 | 216 | 237 | 261 | 325 |
| O₂ [%] in desiccator | 16.7 | 15.4 | 11.6 | 11 | 9.9 | 9.5 | 8.4 | 7.6 | 6.1 | 4.1 | 2.1 |
| O₂ scavenged (mL/g powder) | 0.588 | 0.77 | 1.30 | 1.39 | 1.54 | 1.60 | 1.75 | 1.86 | 2.07 | 2.35 | 2.63 |
| O₂ scavenged (mL/g oleic acid) | 20.2 | 26.4 | 44.7 | 47.6 | 52.9 | 54.8 | 60.1 | 63.9 | 71.2 | 80.8 | 90.4 |

Figure 3:
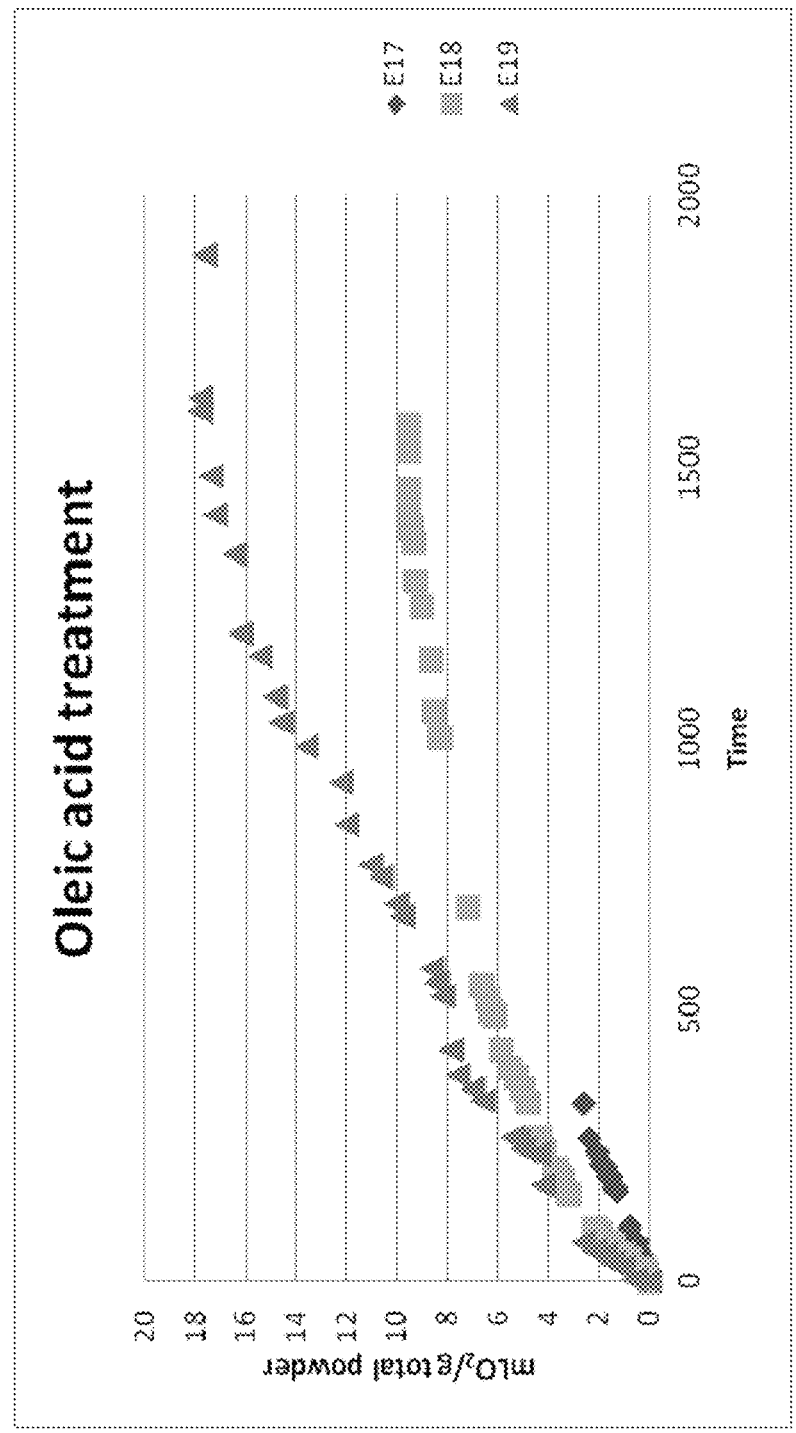
FIG. 3 shows the results of oxygen scavenging tests of oleic acid treatment in Examples 17, 18, and 19, in terms of $O_2$ scavenged (mL $O_2$/g total powder).
Figure 4:
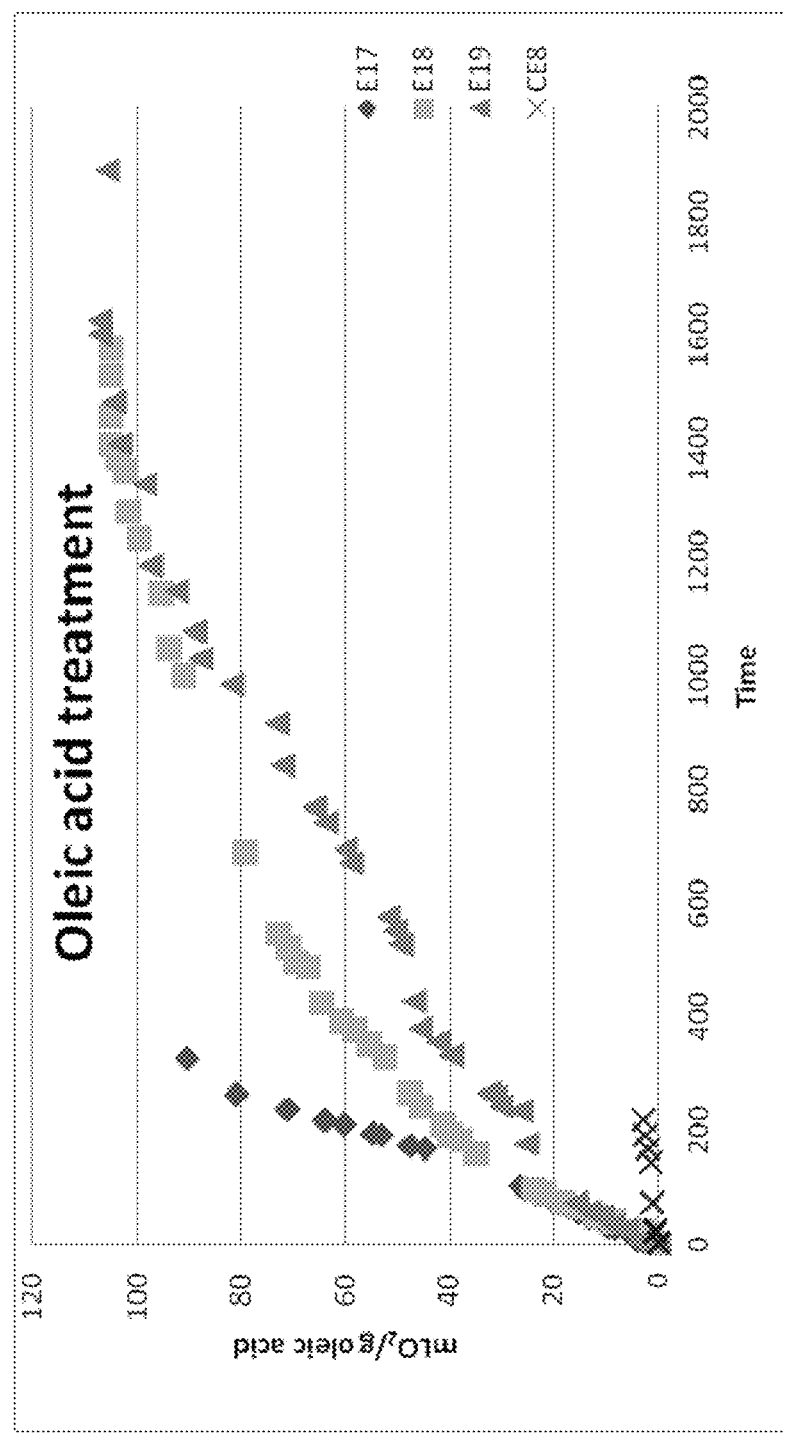
FIG. 4 shows the results of oxygen scavenging tests of oleic acid treatment in Examples 17, 18, and 19, in terms of $O_2$ scavenged (mL $O_2$/g oleic acid).

The results of Example 17 are also shown in FIGS. 3 and 4.

4.1.5 Example 18

110 g of the powder from Example 5 were placed in a closed desiccator having a volume of approx. 7 L, and O₂ amount was recorded regularly. This treatment level corresponds to approx. 2.70 mg/m². The results of the oxygen scavenging test are summarized in Table 8 below.

TABLE 8

Oxygen scavenging test

| | Time [h] | | | | | | | | | | |
|---|---|---|---|---|---|---|---|---|---|---|---|
| | 0 | 17 | 21 | 40 | 48 | 64 | 72 | 88 | 96 | 160 | 184 | 192 |
| O₂ [%] in desiccator | 20.9 | 20.7 | 20.5 | 19.7 | 19.2 | 18.7 | 18.3 | 17.8 | 17.5 | 15.9 | 15.5 | 15.2 |
| O₂ scavenged (mL/g powder) | 0 | 0.127 | 0.255 | 0.764 | 1.08 | 1.4 | 1.66 | 1.97 | 2.16 | 3.18 | 3.44 | 3.63 |
| O₂ scavenged (mL/g oleic acid) | 0 | 1.4 | 2.8 | 8.4 | 11.9 | 15.4 | 18.2 | 21.7 | 23.8 | 35 | 37.8 | 39.9 |

| | Time [h] | | | | | | | | | | |
|---|---|---|---|---|---|---|---|---|---|---|---|
| | 208 | 240 | 264 | 328 | 352 | 376 | 392 | 424 | 488 | 496 | 520 | 544 |
| O₂ [%] in desiccator | 15 | 14.4 | 14.1 | 13.4 | 13 | 12.6 | 12.2 | 11.7 | 11.3 | 11 | 10.8 | 10.5 |
| O₂ scavenged (mL/g powder) | 3.76 | 4.14 | 4.33 | 4.77 | 5.03 | 5.28 | 5.54 | 5.86 | 6.11 | 6.3 | 6.43 | 6.62 |
| O₂ scavenged (mL/g oleic acid) | 41.3 | 45.5 | 47.6 | 52.5 | 55.3 | 58.1 | 60.9 | 64.4 | 67.2 | 69.3 | 70.7 | 72.8 |

TABLE 8-continued

| Oxygen scavenging test | | | | | | | | | | | | |
|---|---|---|---|---|---|---|---|---|---|---|---|---|
| Time [h] | | | | | | | | | | | | |
| | 688 | 1000 | 1048 | 1144 | 1240 | 1288 | 1360 | 1384 | 1408 | 1456 | 1528 | 1576 |
| $O_2$ [%] in desiccator | 9.6 | 7.9 | 7.5 | 7.3 | 6.7 | 6.4 | 6.3 | 6.1 | 5.9 | 5.9 | 5.9 | 5.9 |
| $O_2$ scavenged (mL/g powder) | 7.19 | 8.27 | 8.53 | 8.66 | 9.04 | 9.23 | 9.29 | 9.42 | 9.55 | 9.55 | 9.55 | 9.55 |
| $O_2$ scavenged (mL/g oleic acid) | 79.1 | 91 | 93.8 | 95.2 | 99.4 | 102 | 102 | 104 | 105 | 105 | 105 | 105 |

The results of Example 18 are also shown in FIGS. 3 and 4.

4.1.6 Example 19

35 g of the powder from Example 6 were placed in a closed desiccator having a volume of approx. 7 L, and $O_2$ amount was recorded regularly. This treatment level corresponds to approx. 5.41 mg/m². The results of the oxygen scavenging test are summarized in Table 9 below.

TABLE 9

| Oxygen scavenging test | | | | | | | | | | | | |
|---|---|---|---|---|---|---|---|---|---|---|---|---|
| Time [h] | | | | | | | | | | | | |
| | 0 | 3 | 24 | 32 | 48 | 56 | 72 | 176 | 234 | 242 | 258 | 266 |
| $O_2$ [%] in desiccator | 20.9 | 20.6 | 20.4 | 20.2 | 20 | 19.8 | 19.6 | 18.8 | 18.7 | 18.4 | 18.3 | 18.2 |
| $O_2$ scavenged (mL/g powder) | 0 | 0.6 | 1 | 1.4 | 1.8 | 2.2 | 2.6 | 4.2 | 4.4 | 5 | 5.2 | 5.4 |
| $O_2$ scavenged (mL/g oleic acid) | 0 | 3.60 | 6.00 | 8.40 | 10.8 | 13.2 | 15.6 | 25.2 | 26.4 | 30.0 | 31.2 | 32.4 |
| Time [h] | | | | | | | | | | | |
| | 330 | 354 | 378 | 426 | 526 | 550 | 574 | 670 | 694 | 742 | 766 | 840 |
| $O_2$ [%] in desiccator | 17.6 | 17.4 | 17.1 | 17 | 16.8 | 16.7 | 16.6 | 16 | 15.9 | 15.6 | 15.4 | 14.9 |
| $O_2$ scavenged (mL/g powder) | 6.6 | 7 | 7.6 | 7.8 | 8.2 | 8.4 | 8.6 | 9.8 | 10 | 10.6 | 11 | 12 |
| $O_2$ scavenged (mL/g oleic acid) | 39.6 | 42.0 | 45.6 | 46.8 | 49.2 | 50.4 | 51.6 | 58.8 | 60.0 | 63.6 | 66.0 | 72.0 |
| Time [h] | | | | | | | | | | | |
| | 916 | 984 | 1028 | 1076 | 1148 | 1192 | 1336 | 1408 | 1480 | 1600 | 1624 | 1888 |
| $O_2$ [%] in desiccator | 14.8 | 14.1 | 13.6 | 13.5 | 13.2 | 12.8 | 12.7 | 12.3 | 12.2 | 12 | 12 | 12.1 |
| $O_2$ scavenged (mL/g powder) | 12.2 | 13.6 | 14.6 | 14.8 | 15.4 | 16.2 | 16.4 | 17.2 | 17.4 | 17.8 | 17.8 | 17.6 |
| $O_2$ scavenged (mL/g oleic acid) | 73.2 | 81.7 | 87.7 | 88.9 | 92.5 | 97.3 | 98.5 | 103 | 105 | 107 | 107 | 106 |

The results of Example 19 are also shown in FIGS. 3 and 4.

4.1.7—Example 20

200 g of the powder from Example 10 were placed in a closed desiccator having a volume of approx. 2.9 L, and $O_2$ amount was recorded regularly. This treatment level corresponds to approx. 2.70 mg/m$^2$. The results of the oxygen scavenging test are summarized in Table 10 below.

TABLE 10

| | Oxygen scavenging test | | | | | | | | | | |
|---|---|---|---|---|---|---|---|---|---|---|---|
| | Time [h] | | | | | | | | | | |
| | 0 | 2 | 4 | 16 | 24 | 32 | 48 | 54 | 126 | 150 | 174 |
| $O_2$ [%] in desiccator | 20.9 | 20.7 | 20.6 | 19.5 | 19.1 | 18.7 | 18.4 | 18 | 17 | 16.7 | 16.6 |
| $O_2$ scavenged (mL/g powder) | 0 | 0.029 | 0.043 | 0.203 | 0.261 | 0.319 | 0.363 | 0.421 | 0.566 | 0.609 | 0.624 |
| $O_2$ scavenged (mL/g gallic acid) | 0 | 0.3 | 0.5 | 2.2 | 2.9 | 3.5 | 4.0 | 4.6 | 6.2 | 6.7 | 6.9 |

| | Time [h] | | | | |
|---|---|---|---|---|---|
| | 198 | 222 | 630 | 702 | 798 |
| $O_2$ [%] in desiccator | 16.2 | 15.9 | 14 | 13.9 | 13.9 |
| $O_2$ scavenged (mL/g powder) | 0.682 | 0.725 | 1.00 | 1.02 | 1.02 |
| $O_2$ scavenged (mL/g gallic acid) | 7.5 | 8.0 | 11.0 | 11.2 | 11.2 |

Figure 7:
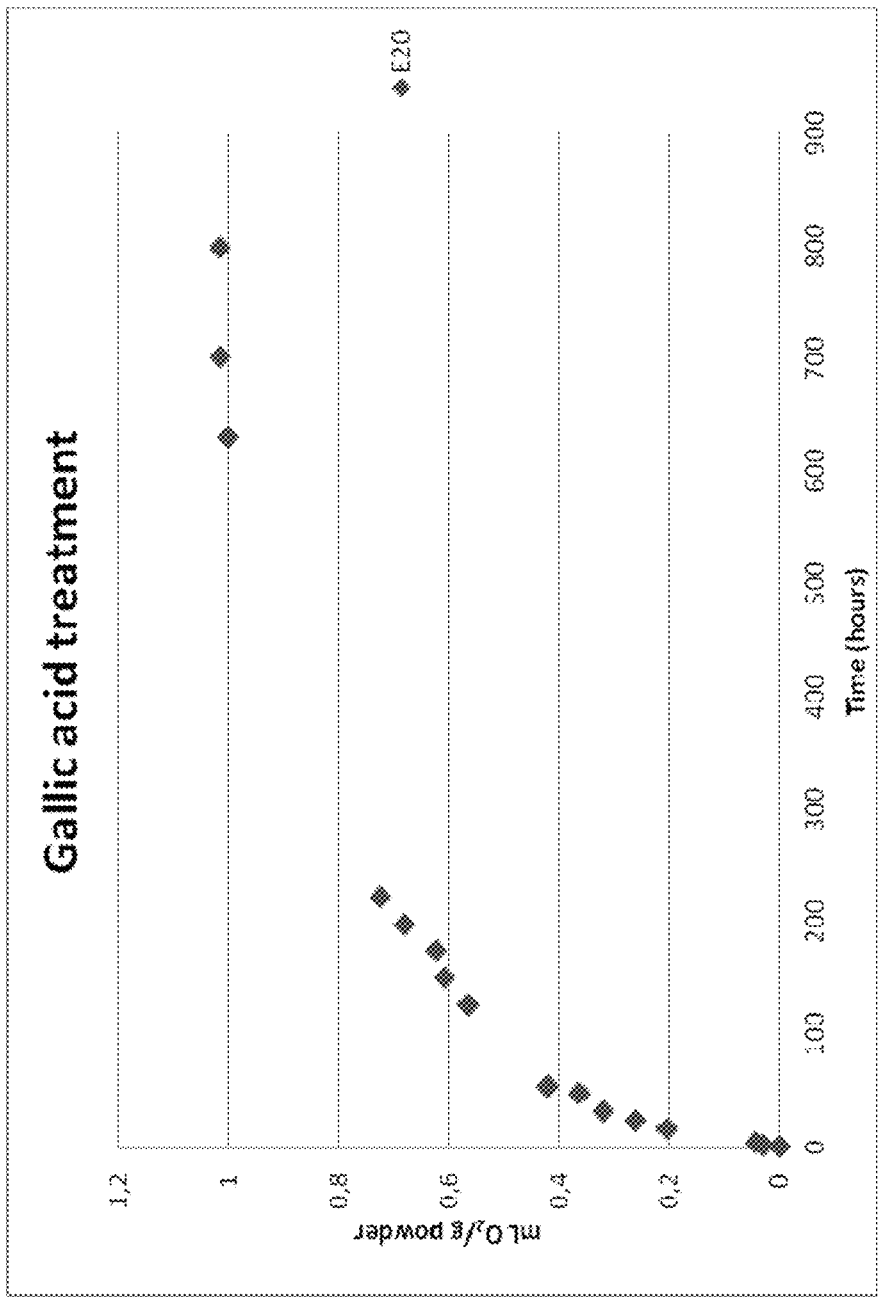
FIG. 7 shows the results of oxygen scavenging tests of gallic acid treatment in Example 20, in terms of $O_2$ scavenged (mL $O_2$/g total powder).
Figure 8:
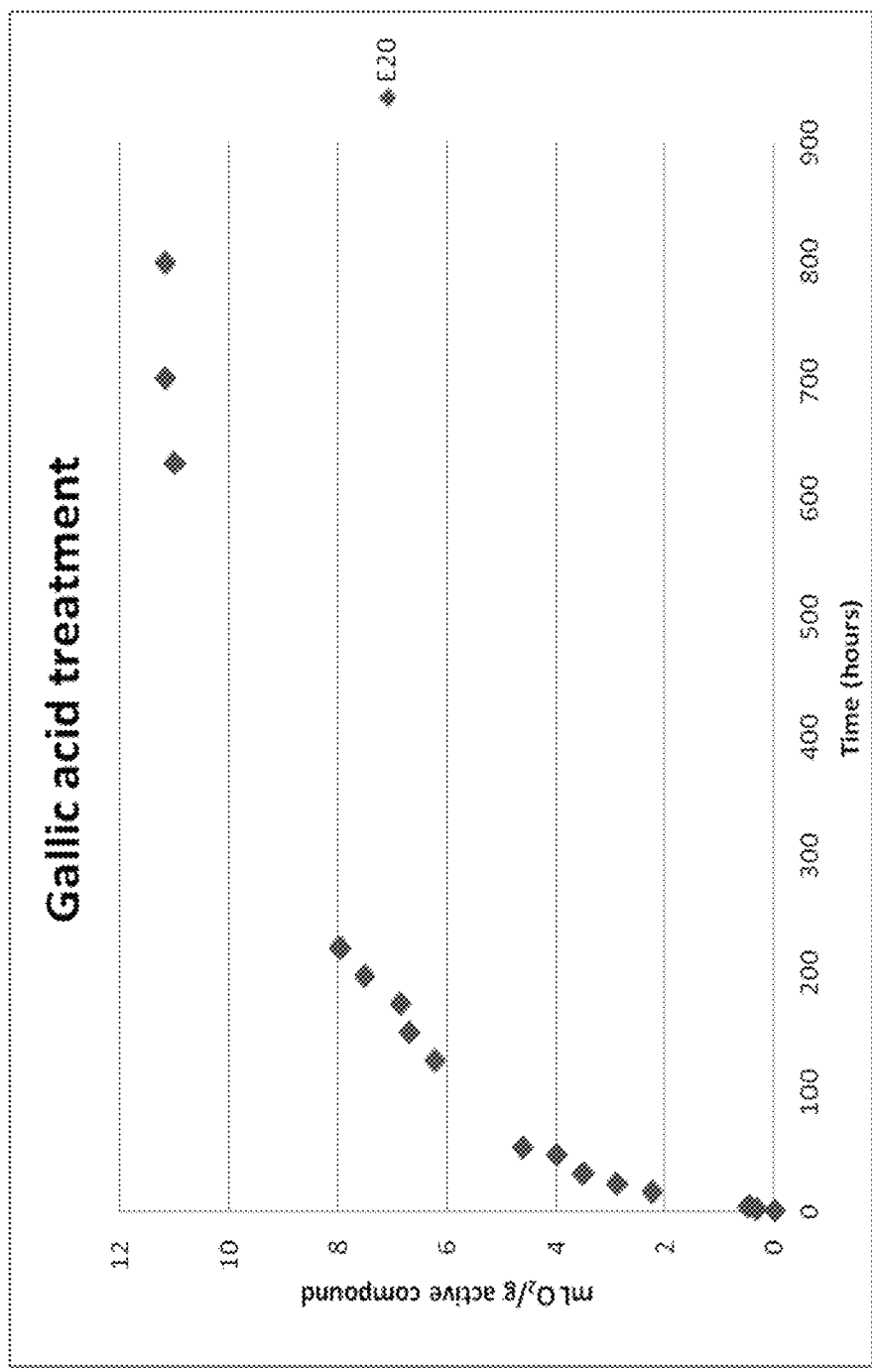
FIG. 8 shows the results of oxygen scavenging tests of gallic acid treatment in Example 20, in terms of $O_2$ scavenged (mL $O_2$/g active compound).

The results of Example 20 are also shown in FIGS. 7 and 8.

4.1.8 Example 21

500 g of the powder from Example 8 were placed in a closed desiccator having a volume of approx. 2.9 L, and $O_2$ amount was recorded regularly. This treatment level corresponds to approx. 2.70 mg/m$^2$. The results of the oxygen scavenging test are summarized in Table 11 below.

TABLE 11

| | Oxygen scavenging test | | | | | | | | | | |
|---|---|---|---|---|---|---|---|---|---|---|---|
| | Time [h] | | | | | | | | | | |
| | 0 | 1 | 2 | 18 | 23 | 26 | 42 | 50 | 114 | 122 | 146 |
| $O_2$ [%] in desiccator | 20.9 | 20.5 | 20.3 | 17 | 16 | 15.5 | 13.2 | 12.3 | 7.9 | 7.2 | 6.1 |
| $O_2$ scavenged (mL/g powder) | 0 | 0.116 | 0.174 | 1.13 | 1.42 | 1.57 | 2.23 | 2.49 | 3.77 | 3.97 | 4.29 |
| $O_2$ scavenged (mL/g ascorbic acid) | 0 | 1.28 | 1.91 | 12.4 | 15.6 | 17.2 | 24.6 | 27.4 | 41.5 | 43.7 | 47.2 |

TABLE 11-continued

| | Oxygen scavenging test | | | |
|---|---|---|---|---|
| | Time [h] | | | |
| | 170 | 194 | 314 | 626 |
| O₂ [%] in desiccator | 5 | 4.6 | 2.1 | 0.7 |
| O₂ scavenged (mL/g powder) | 4.61 | 4.73 | 5.45 | 5.86 |
| O₂ scavenged (mL/g ascorbic acid) | 50.7 | 52.0 | 60.0 | 64.4 |

Figure 5:
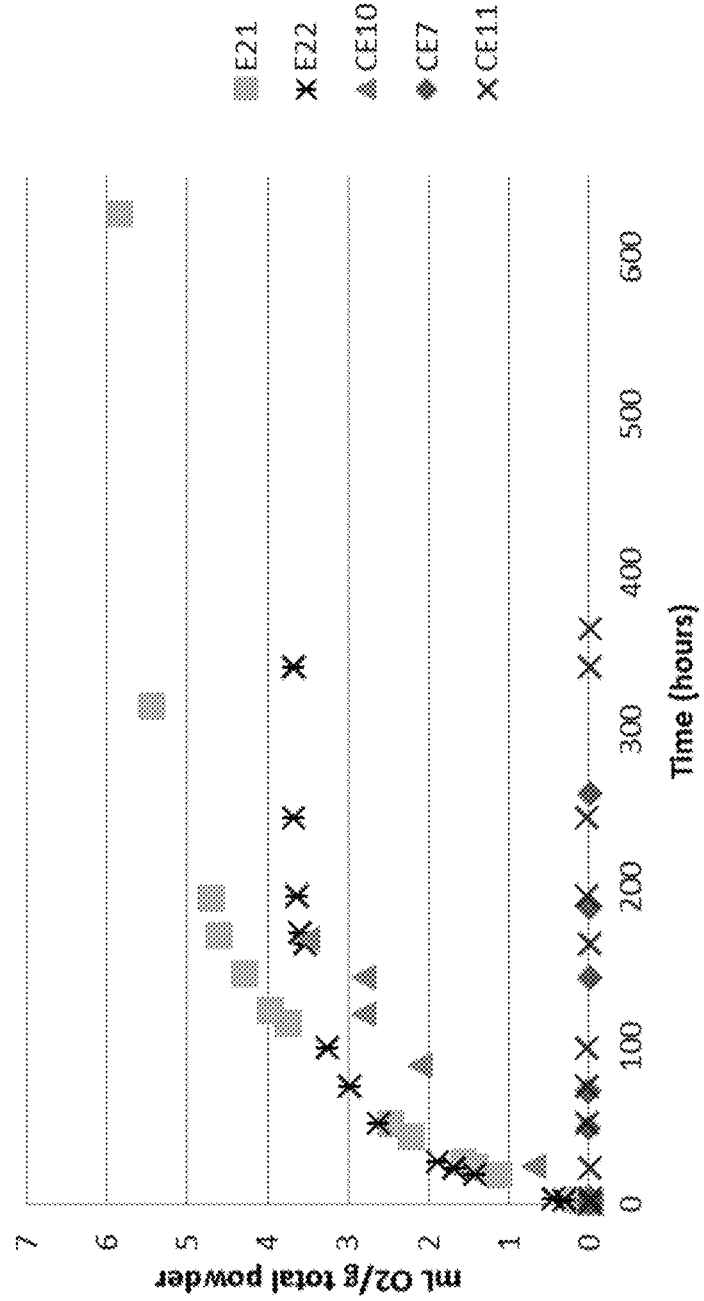
FIG. 5 shows the results of oxygen scavenging tests of ascorbic acid treatment and isoascorbic acid treatment in Examples 21 and 22, in terms of $O_2$ scavenged (mL $O_2$/g total powder).
Figure 6:
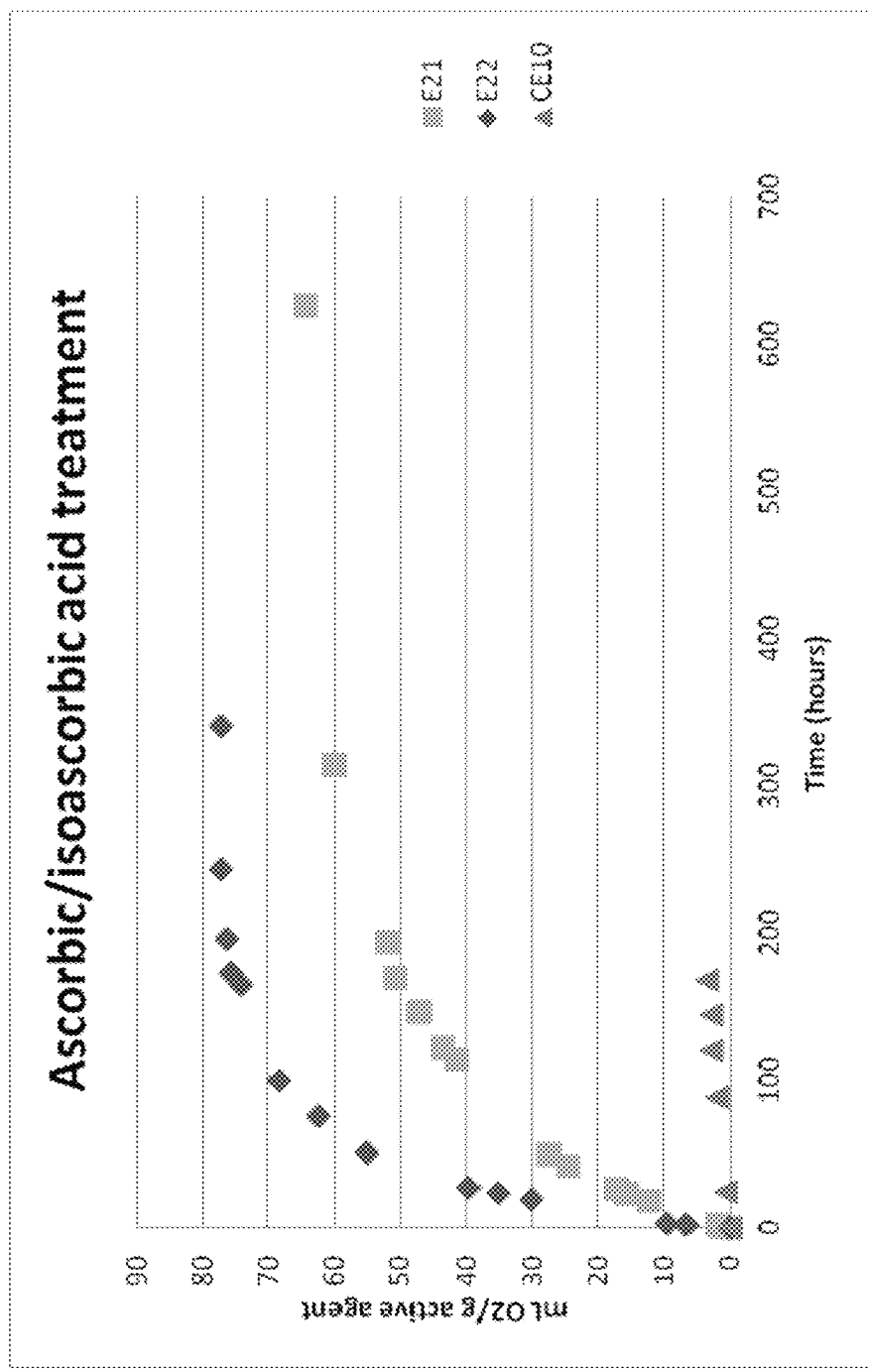
FIG. 6 shows the results of oxygen scavenging tests of ascorbic acid treatment and isoascorbic acid treatment in Examples 21 and 22, in terms of $O_2$ scavenged (mL $O_2$/g active agent).

The results of Example 21 are also shown in FIGS. 5 and 6.

4.1.9 Example 22

200 g of the powder from Example 9 were placed in a closed desiccator having a volume of approx. 7 L, and $O_2$ amount was recorded regularly. This treatment level corresponds to approx. 0.36 mg/m². The results of the oxygen scavenging test are summarized in Table 12 below.

TABLE 12

| | Oxygen scavenging test | | | | | | | | | | |
|---|---|---|---|---|---|---|---|---|---|---|---|
| | Time [h] | | | | | | | | | | |
| | 0 | 2 | 3 | 19 | 23 | 27 | 51 | 75 | 99 | 165 | 172 |
| O₂ [%] in desiccator | 20.9 | 20 | 19.6 | 16.8 | 16.1 | 15.5 | 13.4 | 12.4 | 11.6 | 10.8 | 10.6 |
| O₂ scavenged (mL/g powder) | 0 | 0.315 | 0.455 | 1.44 | 1.68 | 1.89 | 2.63 | 2.98 | 3.26 | 3.54 | 3.61 |
| O₂ scavenged (mL/g isoascorbic acid) | 0 | 6.62 | 9.56 | 30.1 | 35.3 | 39.7 | 55.1 | 62.5 | 68.4 | 74.3 | 75.7 |

| | Time [h] | | |
|---|---|---|---|
| | 196 | 244 | 340 |
| O₂ [%] in desiccator | 10.5 | 10.4 | 10.4 |
| O₂ scavenged (mL/g powder) | 3.64 | 3.68 | 3.68 |
| O₂ scavenged (mL/g isoascorbic acid) | 76.5 | 77.2 | 77.2 |

The results of Example 22 are also shown in FIGS. 5 and 6.

4.1.10 Example 23

100 g of the powder from Example 11 were placed in a sealed 7 L desiccator, and $O_2$ amount was recorded regularly. This treatment level corresponds to approx. 1.30 mg/m². The results of the oxygen scavenging test are summarized in Table 13 below.

TABLE 13

| | Oxygen scavenging test | | | | | | | |
|---|---|---|---|---|---|---|---|---|
| | Time [h] | | | | | | | |
| | 0 | 1 | 3 | 24 | 28 | 72 | 96 | 168 |
| O₂ [%] in desiccator | 20.9 | 20.7 | 20.6 | 20.4 | 20.4 | 20.2 | 20.2 | 20.1 |
| O₂ scavenged (mL/g powder) | 0 | 0.14 | 0.21 | 0.35 | 0.35 | 0.49 | 0.49 | 0.56 |

TABLE 13-continued

| Oxygen scavenging test | | | | | | | | |
|---|---|---|---|---|---|---|---|---|
| | Time [h] | | | | | | | |
| | 0 | 1 | 3 | 24 | 28 | 72 | 96 | 168 |
| $O_2$ scavenged (mL/g Iron sulphate pentahydrate) | 0 | 3.06 | 4.59 | 7.64 | 7.64 | 10.7 | 10.7 | 12.2 |

Figure 9:
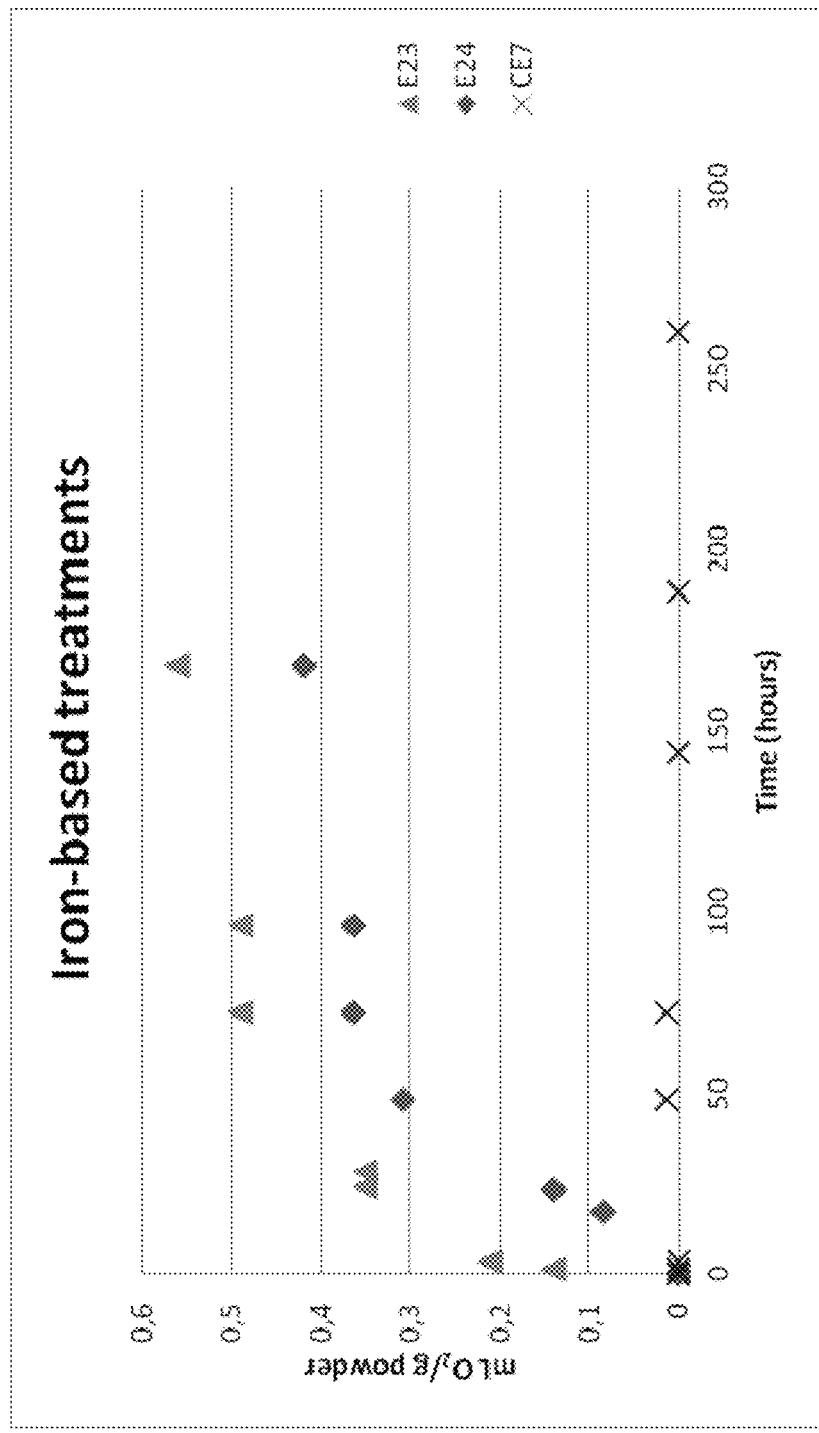
FIG. 9 shows the results of oxygen scavenging tests of iron sulphate pentahydrate treatment and iron nanopowder in Examples 23 and 24, in terms of $O_2$ scavenged (mL $O_2$/g total powder).

The results of Example 23 are also shown in FIG. 9.

4.1.11 Example 24

250 g of the powder from Example 12 were placed in a sealed 7 L desiccator, and $O_2$ amount was recorded regularly. This treatment level corresponds to approx. 0.81 mg/m². The results of the oxygen scavenging test are summarized in Table 14 below.

TABLE 14

| Oxygen scavenging test | | | | | | | |
|---|---|---|---|---|---|---|---|
| | Time [h] | | | | | | |
| | 0 | 17 | 23 | 48 | 72 | 96 | 168 |
| $O_2$ [%] in desiccator | 20.9 | 20.6 | 20.4 | 19.8 | 19.6 | 19.6 | 19.4 |
| $O_2$ scavenged (mL/g powder) | 0 | 0.084 | 0.14 | 0.308 | 0.364 | 0.364 | 0.42 |
| $O_2$ scavenged (mL/g Iron nanopowder) | 0 | 2.88 | 4.81 | 10.58 | 12.5 | 12.5 | 14.42 |

The results of Example 24 are also shown in FIG. 9.

4.1.10 Comparative Example 7

500 g of the powder from Comparative Example 1 were placed in a sealed 7 L desiccator, and $O_2$ amount was recorded regularly. No noticeable change in $O_2$ levels could be noticed after 2 weeks. The results of the oxygen scavenging test are summarized in Table 15 below.

TABLE 15

| Oxygen scavenging test | | | | | | | | |
|---|---|---|---|---|---|---|---|---|
| | Time [h] | | | | | | | |
| | 0 | 1 | 3 | 48 | 72 | 144 | 188 | 260 |
| $O_2$ [%] in desiccator | 20.9 | 20.9 | 20.9 | 20.8 | 20.8 | 20.9 | 20.9 | 20.9 |
| $O_2$ scavenged (mL/g powder) | 0 | 0 | 0 | 0.01 | 0.01 | 0 | 0 | 0 |

The results of Comparative Example 7 are also shown in FIGS. 5 and 9.

4.1.11 Comparative Example 8

14.5 g of oleic acid (Comparative Example 3) were placed in a sealed 7 L desiccator, and $O_2$ amount was recorded regularly. The results of the oxygen scavenging test are summarized in Table 16 below.

TABLE 16

| Oxygen scavenging test | | | | | | | | |
|---|---|---|---|---|---|---|---|---|
| | Time [h] | | | | | | | |
| | 0 | 3 | 20 | 24 | 72 | 144 | 168 | 192 | 216 |
| $O_2$ [%] in desiccator | 20.9 | 20.9 | 20.8 | 20.8 | 20.7 | 20.6 | 20.5 | 20.4 | 20.3 |
| $O_2$ scavenged (mL/g oleic acid) | 0 | 0 | 0.48 | 0.48 | 0.97 | 1.45 | 1.93 | 2.41 | 2.90 |

The results of Comparative Example 8 are also shown in FIG. 4.

4.1.12 Comparative Example 9

14.5 g of linoleic acid (Comparative Example 2) were put in a 50 mL beaker and placed in a sealed 7 L desiccator, and $O_2$ amount was recorded regularly. The results of the oxygen scavenging test are summarized in Table 17 below.

TABLE 17

| | Oxygen scavenging test | | | | | | | | |
|---|---|---|---|---|---|---|---|---|---|
| | Time [h] | | | | | | | | |
| | 0 | 3 | 20 | 24 | 72 | 144 | 168 | 192 | 216 |
| $O_2$ [%] in desiccator | 20.9 | 20.9 | 20.6 | 20.4 | 19.6 | 17.6 | 16.6 | 15.6 | 14.9 |
| $O_2$ scavenged (mL/g linoleic acid) | 0 | 0 | 1.45 | 2.41 | 6.28 | 15.9 | 20.8 | 25.6 | 29.0 |

The results of Comparative Example 9 are also shown in FIG. 2.

4.1.13 Comparative Example 10

10 g of (L)-ascorbic acid crystalline powder (Sigma life science, reagent grade, China, powder from Comparative Example 4) were placed in a sealed 7 L desiccator, and $O_2$ amount was recorded regularly. The results of the oxygen scavenging test are summarized in Table 18 below.

TABLE 18

| | Oxygen scavenging test | | | | | |
|---|---|---|---|---|---|---|
| | Time [h] | | | | | |
| | 0 | 24 | 88 | 120 | 144 | 168 |
| $O_2$ [%] in desiccator | 20.9 | 20.8 | 20.6 | 20.5 | 20.5 | 20.4 |
| $O_2$ scavenged (mL/g ascorbic acid) | 0 | 0.7 | 2.1 | 2.8 | 2.8 | 3.5 |

The results of Comparative Example 10 are also shown in FIGS. 5 and 6.

4.1.14 Comparative Example 11

200 g of the powder from Comparative Example 5 were placed in a sealed 7 L desiccator, and $O_2$ amount was recorded regularly. No noticeable change in $O_2$ levels could be noticed after 2 weeks. The results of the oxygen scavenging test are summarized in Table 19 below.

TABLE 19

| | Oxygen scavenging test | | | | | | | | | |
|---|---|---|---|---|---|---|---|---|---|---|
| | Time [h] | | | | | | | | | |
| | 0 | 3 | 23 | 51 | 75 | 99 | 165 | 196 | 244 | 340 | 364 |
| $O_2$ [%] in desiccator | 20.9 | 20.9 | 20.9 | 20.8 | 20.8 | 20.8 | 20.9 | 20.8 | 20.8 | 20.9 | 20.9 |
| $O_2$ scavenged (mL/g powder) | 0 | 0 | 0 | 0.04 | 0.04 | 0.04 | 0 | 0.04 | 0.04 | 0 | 0 |

The results of Comparative Example 11 are also shown in FIG. 5.

4.2 Tests on Coated Papers

4.2.1 Example 25: Paper from Example 13 (with Oleic Acid)

136 strips (5×18 cm²) of coated paper from Example 13 are cut in smaller pieces (each strip was cut in 4) and placed in a sealed 2.9 L desiccator, and $O_2$ amount was recorded regularly. The estimated amount of coating (by weight) used for this test was 84 g. The results of the oxygen scavenging test are summarized in Table 20 below.

TABLE 20

Oxygen scavenging test of the coated paper

| | Time [h] | | | | | | | | | |
|---|---|---|---|---|---|---|---|---|---|---|
| | 0 | 24 | 48 | 72 | 164 | 188 | 212 | 236 | 308 | 356 | 404 |
| $O_2$ [%] in desiccator | 20.9 | 20.8 | 20.8 | 20.7 | 20.5 | 20.3 | 20.1 | 19.9 | 19.3 | 19.2 | 19.1 |
| $O_2$ scavenged (mL/g coating) | 0 | 0.035 | 0.035 | 0.069 | 0.138 | 0.207 | 0.276 | 0.345 | 0.552 | 0.587 | 0.621 |
| $O_2$ scavenged (mL/g active compound) | 0 | 1.18 | 1.18 | 2.37 | 4.73 | 7.10 | 9.47 | 11.8 | 18.9 | 20.1 | 21.3 |

Figure 10:
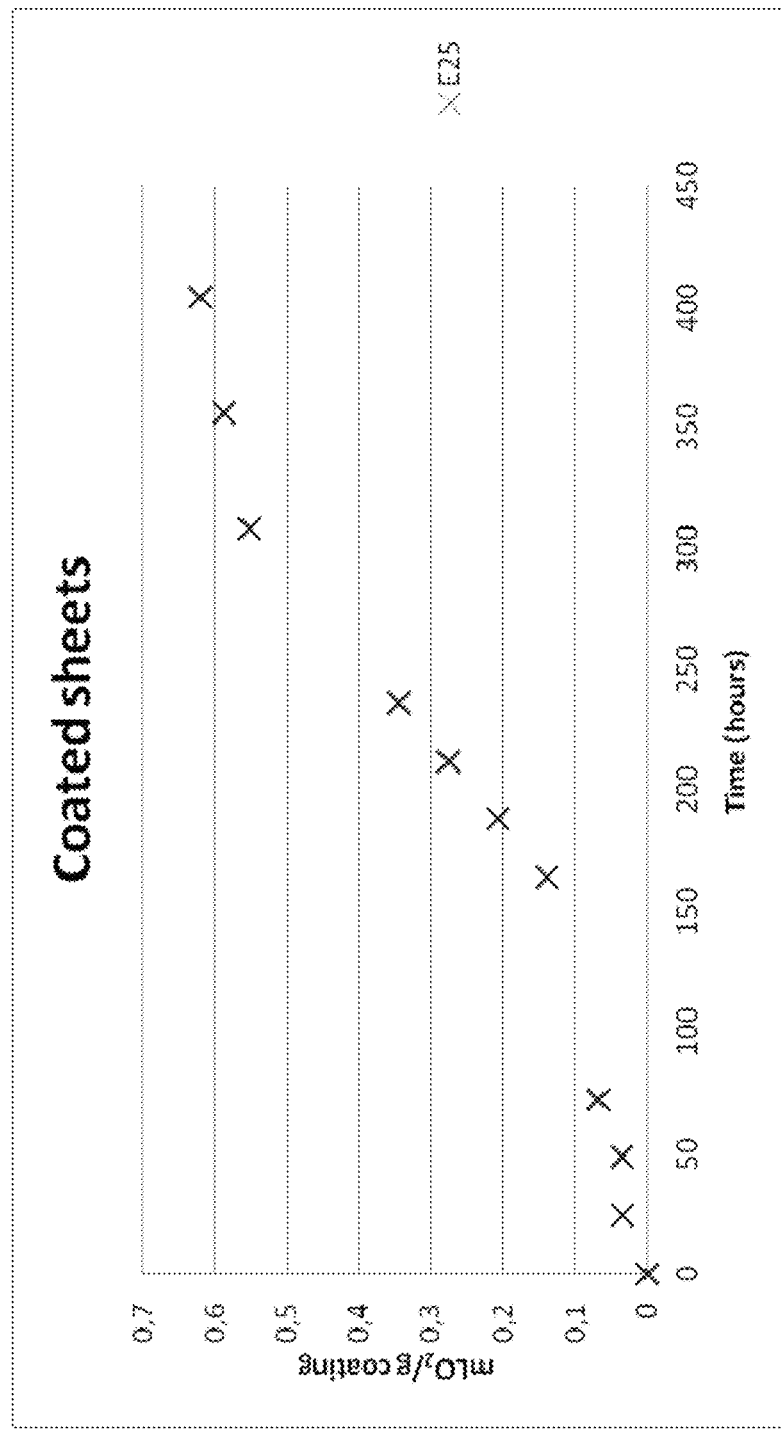
FIG. 10 shows the results of oxygen scavenging tests of paper coated with oleic acid in Example 25, in terms of $O_2$ scavenged (mL $O_2$/g coating).

The results of Example 25 are also shown in FIG. 10.

All of the examples show that high $O_2$ scavenging values can be achieved with the treated surface-reacted calcium carbonate. Thus, the reaction with $O_2$ can be enhanced by using the treatment agent in combination with surface-reacted calcium carbonate, possibly through an increased available surface area. Furthermore, the scavenging speed can be increased by the using the treated surface-reacted calcium carbonate.

The invention claimed is:

1. A method for the treatment of a surface-reacted calcium carbonate, the method comprising the steps of:
   a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;
   b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and
   c) combining the surface-reacted calcium carbonate of step a) with the treatment agent of step b) in one or more steps at a temperature of from 10 to 200° C. under mixing, such that the total weight of the treatment agent added is from 0.01 to 40 mg/m², based on the surface-reacted calcium carbonate of step a),
   wherein the surface-reacted calcium carbonate provided in step a) has a moisture content of less than 10.0 wt.-% based on the dry weight of the surface-reacted calcium carbonate provided in step a), and
   wherein the one or more $H_3O^+$ ion donors is selected from the group consisting of hydrochloric acid, sulphuric acid, sulphurous acid, phosphoric acid, citric acid, oxalic acid, acetic acid, formic acid, and mixtures thereof.

2. The method according to claim 1, wherein the natural ground calcium carbonate is selected from calcium carbonate containing minerals selected from the group comprising marble, chalk, dolomite, limestone and mixtures thereof; and that the precipitated calcium carbonate is selected from the group comprising precipitated calcium carbonates having aragonitic, vateritic or calcitic mineralogical crystal forms or mixtures thereof.

3. The method according to claim 1, wherein the surface-reacted calcium carbonate has
   i) a specific surface area of from 15 m²/g to 200 m²/g, measured using nitrogen and the BET method according to ISO 9277, and/or
   ii) a volume median grain diameter $d_{50}$ of from 1 to 75 µm, and/or
   iii) an intra-particle pore size in a range of from 0.004 to 1.6 µm, determined from a mercury porosimetry measurement, and/or
   iv) an intra-particle intruded specific pore volume within the range of 0.1 to 2.3 cm³/g, calculated from mercury porosimetry measurement.

4. The method according to claim 1, wherein the treatment agent is
   a) liquid at 25° C. and ambient pressure, or
   b) in molten form, and/or
   c) dissolved in a solvent, or
   d) dispersed in a suspension.

5. The method according to claim 1, wherein the total weight of the treatment agent of step b) added in step c) is from 0.1 to 40 mg/m², based on the surface-reacted calcium carbonate of step a).

6. The method according to claim 1, wherein the treatment agent of step b) is added in step c) in an amount of from 0.01 to 80.0 wt.-%, based on the total dry weight of surface-reacted calcium carbonate of step a).

7. The method according to claim 1, wherein the unsaturated fatty acid is selected from the group consisting of oleic acid, linoleic acid, linolenic acid, crotonic acid, myristoleic acid, palmitoleic acid, sapienic acid, elaidic acid, vaccenic acid, gadoleic acid, erucic acid, nervonic acid, ecosadienoic acid, docosadienoic acid, pinoleic acid, eleostearic acid, mead acid, dihomo-γ-linolenic acid, eicosatrienoic acid, stearidonic acid, arachidonic acid, eicosatetraenoic acid, adrenic acid, bosseopentaenoic acid, eicosapentaenoic acid, ozubondo acid, sardine acid, tetracosanolpentaenoic acid, docosahexaenoic acid, herring acid, salts of these acids and mixtures thereof.

8. The method according to claim 1, wherein the treatment agent is ascorbic acid and/or salts thereof, gallic acid and/or thereof and mixtures thereof.

9. The method according to claim 1, wherein the method comprises a further step d) of treating the surface-reacted calcium carbonate obtained in step c) with at least one supplemental agent which is a hydrophobising agent.

10. The method according to claim 1, wherein the method comprises a further step of encapsulating the surface-reacted calcium carbonate obtained in step c).

11. A treated surface-reacted calcium carbonate comprising
   a) a surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source, and
   b) a treatment agent is located as a treatment layer on at least a part of the surface of the surface-reacted calcium carbonate and/or the treatment agent is loaded into at least a part of the pores as a pore filler of the surface-reacted calcium carbonate, wherein
      i) the treatment layer or the pore filler consists of a treatment agent selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof, and/or reaction products thereof,
      ii) the total weight of the treatment agent on the total surface area or in the pores of the surface-reacted calcium carbonate is from 0.01 to 40 mg/m$^2$, based on the surface-reacted calcium carbonate of step a), and
      iii) the surface-reacted calcium carbonate provided in a) has a moisture content of less than 10.0 wt.-% based on the dry weight of the surface-reacted calcium carbonate provided in step a)
   wherein the one or more $H_3O^+$ ion donors is selected from the group consisting of hydrochloric acid, sulphuric acid, sulphurous acid, phosphoric acid, citric acid, oxalic acid, acetic acid, formic acid, and mixtures thereof.

12. The treated surface-reacted calcium carbonate according to claim 11, wherein the total weight of the treatment agent on the total surface area or in the pores of the surface-reacted calcium carbonate is from 0.01 to 40 mg/m$^2$.

13. The treated surface-reacted calcium carbonate according to claim 11, wherein the treated surface-reacted calcium carbonate has a moisture pick up susceptibility in the range from 0.05 to 100 mg/g.

14. The treated surface-reacted calcium carbonate according to claim 11, wherein the treated surface-reacted calcium carbonate comprises at least one supplemental agent which is a hydrophobising agent which at least partially covers the treated surface-reacted calcium carbonate or is loaded into at least a part of the pores of treated surface-reacted calcium carbonate.

15. The treated surface-reacted calcium carbonate according to claim 14, wherein the total weight of the at least one hydrophobising agent on the total surface area or in the pores of the treated surface-reacted calcium carbonate is from 0.001 to 10 mg/m$^2$.

16. A product comprising the treated surface-reacted calcium carbonate of claim 11 as an oxygen scavenger.

17. The product use according to claim 16, wherein the product is selected from the group consisting of polymer compositions, coatings, polymer coatings, paper coatings, products in food applications, products in filter and/or cosmetic applications.

18. The method according to claim 9, wherein the method comprises a further step of encapsulating the surface-reacted calcium carbonate obtained in step d).

19. A method for the treatment of a surface-reacted calcium carbonate, the method consists of the steps of:
   a) providing surface-reacted calcium carbonate, wherein the surface-reacted calcium carbonate is a reaction product of natural ground calcium carbonate or precipitated calcium carbonate with carbon dioxide and one or more $H_3O^+$ ion donors, wherein the carbon dioxide is formed in situ by the $H_3O^+$ ion donor treatment and/or is supplied from an external source;
   b) providing a treatment agent being selected from the group consisting of ascorbic acid and/or salts thereof, gallic acid and/or salts thereof, unsaturated fatty acids and/or salts thereof, elemental iron, iron (II)-salts, iron (II)-comprising oxides, iron (II, III)-comprising oxides and mixtures thereof,
   c) combining the surface-reacted calcium carbonate of step a) with the treatment agent of step b) in one or more steps at a temperature of from 10 to 200° C. under mixing, such that the total weight of the treatment agent added is from 0.01 to 40 mg/m$^2$, based on the surface-reacted calcium carbonate of step a),
   d) optionally treating the surface-reacted calcium carbonate obtained in step c) with at least one supplemental agent which is a hydrophobising agent,
   e) optionally encapsulating the surface-reacted calcium carbonate obtained in step c) or, if present, step d), and
   f) optionally drying the surface-reacted calcium carbonate obtained in step c), step d), or step e),
   wherein the surface-reacted calcium carbonate provided in step a) has a moisture content of less than 10.0 wt.-% based on the dry weight of the surface-reacted calcium carbonate provided in step a), and
   wherein the one or more $H_3O^+$ ion donors is selected from the group consisting of hydrochloric acid, sulphuric acid, sulphurous acid, phosphoric acid, citric acid, oxalic acid, acetic acid, formic acid, and mixtures thereof.

20. The method according to claim 1, wherein the treatment agent is gallic acid and/or salts thereof.

* * * * *